United States Patent
Fujihashi et al.

(10) Patent No.: US 11,566,118 B2
(45) Date of Patent: Jan. 31, 2023

(54) NANOFIBER DISPERSION, METHOD OF PRODUCING NANOFIBER DISPERSION, POWDERY NANOFIBERS OBTAINABLE FROM THE DISPERSION, RESIN COMPOSITION CONTAINING THE POWDERY NANOFIBERS AD MOLDING MATERIAL FOR 3D PRINTER USING THE RESIN COMPOSITION

(71) Applicant: Starlite Co., Ltd., Osakia (JP)

(72) Inventors: Masato Fujihashi, Kusatsu (JP); Mayumi Mochida, Moriyama (JP); Toru Horiuchi, Ritto (JP); Yasumasa Kawabe, Kusatsu (JP)

(73) Assignee: Starlite Co., Ltd., Osaka (JP)

(*) Notice: Subject to any disclaimer, the term of this patent is extended or adjusted under 35 U.S.C. 154(b) by 1203 days.

(21) Appl. No.: 15/999,061

(22) PCT Filed: Feb. 8, 2017

(86) PCT No.: PCT/JP2017/004509
§ 371 (c)(1),
(2) Date: Aug. 17, 2018

(87) PCT Pub. No.: WO2017/141779
PCT Pub. Date: Aug. 24, 2017

(65) Prior Publication Data
US 2021/0024722 A1     Jan. 28, 2021

(30) Foreign Application Priority Data

Feb. 18, 2016 (JP) .............................. JP2016-028660
Mar. 18, 2016 (JP) .............................. JP2016-055567

(Continued)

(51) Int. Cl.
*C08K 7/02* (2006.01)
*C08J 3/05* (2006.01)
(Continued)

(52) U.S. Cl.
CPC ................ *C08K 7/02* (2013.01); *B33Y 70/00* (2014.12); *B33Y 80/00* (2014.12); *C08B 15/00* (2013.01);
(Continued)

(58) Field of Classification Search
None
See application file for complete search history.

(56) References Cited

U.S. PATENT DOCUMENTS

| 6,214,957 B1 | 4/2001 | Shiino et al. |
| 2012/0283363 A1 | 11/2012 | Kumamoto et al. |

FOREIGN PATENT DOCUMENTS

| JP | 201156456 A | 3/2011 |
| JP | 2011132327 A | 7/2011 |

(Continued)

OTHER PUBLICATIONS

Shigeji et al, JP 2012-051991, English Translation from J-Plat Pat (Year: 2012).*

(Continued)

*Primary Examiner* — Colin W. Slifka
(74) *Attorney, Agent, or Firm* — Sughrue Mion, PLLC

(57) ABSTRACT

The present application provides a dispersion dispersed satisfactorily cellulose nanofibers, powdery cellulose nanofibers obtained by pulverizing thereof, a resin composition obtained by blending thereof and a molding raw material for a 3D printer by using thereof. It is possible to obtain a composition uniformly finely dispersed the cellulose nanofibers by treating a mixture containing unmodified cellulose nanofibers and a dispersant using a high speed agitating (Continued)

Medialess disperser, and followed by pulverizing the composition to blend with a resin and a rubber component. Also, a resin composition improved in mechanical properties and heat resistance, obtained by blending the powdery cellulose nanofibers above with a thermoplastic resin or a thermosetting resin, is useful as a molding material for a 3D printer.

6 Claims, 1 Drawing Sheet

(30) Foreign Application Priority Data

| Mar. 18, 2016 | (JP) | JP2016-055581 |
|---|---|---|
| May 19, 2016 | (JP) | JP2016-100548 |
| Jan. 11, 2017 | (JP) | JP2017-002581 |
| Jan. 11, 2017 | (JP) | JP2017-002585 |
| Jan. 11, 2017 | (JP) | JP2017-002588 |
| Jan. 20, 2017 | (JP) | JP2017-008232 |

(51) Int. Cl.

| *C08B 15/00* | (2006.01) |
|---|---|
| *C08L 1/02* | (2006.01) |
| *C08L 43/02* | (2006.01) |
| *B33Y 80/00* | (2015.01) |
| *D21H 11/20* | (2006.01) |
| *B33Y 70/00* | (2020.01) |
| *B82Y 30/00* | (2011.01) |
| *B82Y 40/00* | (2011.01) |

(52) U.S. Cl.
CPC . *C08J 3/05* (2013.01); *C08L 1/02* (2013.01); *C08L 43/02* (2013.01); *D21H 11/20* (2013.01); *B82Y 30/00* (2013.01); *B82Y 40/00* (2013.01); *C08J 2301/02* (2013.01)

(56) References Cited

FOREIGN PATENT DOCUMENTS

| JP | 2012-051991 A | 3/2012 |
|---|---|---|
| JP | 2012-224960 A | 11/2012 |
| JP | 2014-118521 A | 6/2014 |
| JP | 2014105217 A | 6/2014 |
| JP | 2014141637 A | 8/2014 |
| JP | 2014162880 A | 9/2014 |
| JP | 2014193959 A | 10/2014 |
| JP | 2015934 A | 1/2015 |
| JP | 2015935 A | 1/2015 |
| JP | 2015143337 A | 8/2015 |
| JP | 2015-196790 A | 11/2015 |
| JP | 2016-028887 A | 3/2016 |
| JP | 201678284 A | 5/2016 |
| JP | 201778145 A | 4/2017 |
| WO | 98/004341 A1 | 2/1998 |
| WO | 2011/071156 A1 | 6/2011 |
| WO | 2011126038 A1 | 10/2011 |
| WO | 2012009972 A1 | 1/2012 |
| WO | 2014133019 A1 | 9/2014 |
| WO | 2015152188 A1 | 10/2015 |
| WO | 2015152189 A1 | 10/2015 |
| WO | 2015178483 A1 | 11/2015 |
| WO | 2015200780 A1 | 12/2015 |

OTHER PUBLICATIONS

International Search Report of PCT/JP2017/004509 dated May 9, 2017.

\* cited by examiner

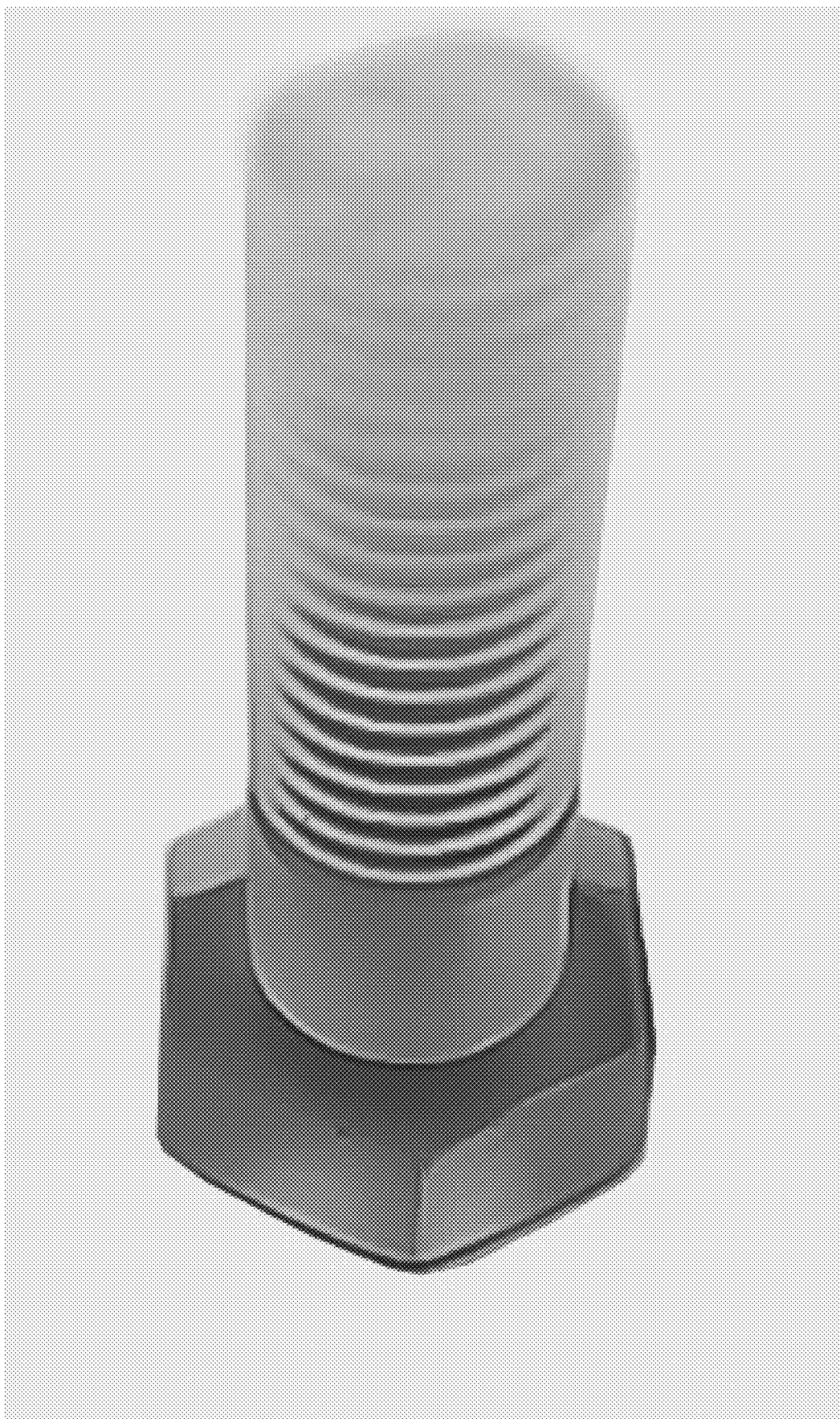

NANOFIBER DISPERSION, METHOD OF PRODUCING NANOFIBER DISPERSION, POWDERY NANOFIBERS OBTAINABLE FROM THE DISPERSION, RESIN COMPOSITION CONTAINING THE POWDERY NANOFIBERS AD MOLDING MATERIAL FOR 3D PRINTER USING THE RESIN COMPOSITION

CROSS REFERENCE TO RELATED APPLICATIONS

This application is a National Stage of Application No. PCT/JP2017/004509 filed Feb. 8, 2017, claiming priority based on Japanese Patent Application No. 2016-028660 filed Feb. 18, 2016, Japanese Patent Application No. 2016-055581 filed Mar. 18, 2016, Japanese Patent Application No. 2016-055567 filed Mar. 18, 2016, Japanese Patent Application No. 2016-100548 filed May 19, 2016, Japanese Patent Application No. 2017-002585 filed Jan. 11, 2017, Japanese Patent Application No. 2017-002588 filed Jan. 11, 2017, Japanese Patent Application No. 2017-002581 filed Jan. 11, 2017, and Japanese Patent Application No. 2017-008232 filed Jan. 20, 2017.

TECHNICAL FIELD

The present invention relates to a nanofiber-dispersion satisfactorily dispersing nanofibers such as cellulose nanofibers, and the like, and a method of producing the same, as well as powdery nanofibers obtainable by drying the nanofiber dispersion, a resin composition dispersed uniformly the nanofibers, and a molding material for a 3D printer using the resin composition.

BACKGROUND ART

Cellulose, which is a biomass abundantly presenting in nature, has a fiber structure by converging nanofibers, and mainly functions as a strong structural material of plants.

In such structural materials of the cellulose fibers, it is difficult to disperse them in the original state of the nanofibers because they are strongly converged by the bonding force mainly between the nanofiber surfaces via the hydrogen bonding.

Thus, there has been proposed in Patent Document 1 a cellulose nanofiber dispersion obtained by subjecting a dispersion containing the cellulose nanofibers and an anionic dispersant of phosphoric acid or polyphosphoric acid, a salt of phosphoric acid or a polyphosphoric acid, a polyacrylic acid, a polyacrylic acid copolymer, a salt of polyacrylic acid, a salt of polyacrylic acid copolymer, or the like, in addition to an anionic dispersant binding thereto at least one kind selected from a group consisting of a phosphate group (P—OH), a carboxyl group (—COOH), a sulfo group (—SO$_3$H), or each salt thereat to high pressure injection treatment.

However, in this Patent Document 1, since the anionic dispersing agent as described above is used as the dispersing agent, an anionic layer is formed on the surface of the cellulose nanofibers, and when a dispersion is produced, a special dedicated device is required to perform the high pressure injection treatment.

Also, there have been proposed conventionally, for example, many resin compositions using the cellulose nanofibers.

However, in a resin composition where conventional cellulose nanofibers and a resin are compounded, the dispersibility of the cellulose nanofibers in the resin may be low in some cases. In addition, when a resin having a relatively high hydrophobicity is used, the dispersibility of the cellulose nanofibers in the resin tends to be particularly low.

Therefore, for example, to improve the dispersibility of the cellulose nanofibers in the resin, a method of obtaining a composite resin composition, where resin particles are uniformly dispersed in a resin (Patent Document 2), and the like, has been proposed by polymerizing the polymerizable compound in a dispersion, where the polymerizable compound and the cellulose nanofibers are dispersed in a solvent.

However, in this method, since the polymerizable compound is polymerized in the dispersion of the cellulose nanofibers, the reaction system becomes complicated and high cost. Further, the obtained composite resin composition itself is dispersed in a solvent and must be separately dried.

Also, to improve the dispersibility of the cellulose nanofibers, there has been proposed a composition blending thereto a dispersant having a resin affinity segment A and a cellulose affinity segment B as well as having the block copolymer structure or the gradient copolymer structure as dispersants (Patent Document 3). However, according to the technique of Patent Document 3, it is necessary to synthesize the dispersant by a special living radical polymerization method, and further it becomes necessary to disperse the cellulose nanofibers in the organic solution of the organic solvent after allowing them to disintegrate and disperse in an organic solvent, thereby requiring complicated and precise control for operation and post-treatment, which has been problematic.

Furthermore, 3D printers capable of producing three-dimensional objects based on design data on a computer can make plastic parts, jigs, products without using molds and melt forming equipment and are rapidly spreading mainly in companies. Especially, 3D printers of fused deposition molding type using thermoplastic resin as a molding material are sold also for low price and are spreading to individuals as well.

As a molding material usable in such a thermal melting lamination method type 3D printer, there has been proposed a functional resin composition containing a thermoplastic resin and a functional nanofiller dispersed in the resin (Patent Document 4). The technical outline of this patent document is to use a twin screw extruder to knead carbon nanofibers or nanoclay particles with supercritical carbon dioxide without using a dispersant. In this case, the dispersion of the nanofillers is not sufficient, the original nanofiller function cannot be sufficiently exerted, and cellulose nanofibers are merely exemplified as the nanofibers.

PRIOR-ART DOCUMENTS

Patent Documents

[Patent Document 1] JP-A-2012-51991
[Patent Document 2] JP-A-2014-105217
[Patent Document 3] JP-A-2014-162880
[Patent Document 4] JP-A-2016-28887

Outline of the Invention

Problems to be Solved by the Invention

The present invention has been made to solve the above problems, and an object of the present invention is to provide a dispersion satisfactorily dispersing nanofibers such as cellulose nanofibers, and the like and a method of producing the same, also powdery nanofibers capable of increasing the dispersibility of the nanofibers such as the cellulose nanofibers, and the like, in a matrix component such as a resin, and the like, and a method of producing thereof, as well as a composition dispersing uniformly the nanofibers above in a matrix component thereof, further, by subjecting the nanofibers such as the cellulose nanofibers, and the like, to dispersing uniformly in a resin to improve strength, flexural modulus, thereby making it possible to reproduce more accurately the shape of the design as a molded product and to get a molding material for a 3D printer capable obtaining a three-dimensional mold excellent in the transparency and dyeability in addition to the surface smoothness.

Means for Solving the Problems

The present invention is composed of the following claims 1 to 22.

<Claim 1>

A nanofiber dispersion comprising nanofibers and a dispersant, wherein the dispersant is (meth)acryloyloxyethyl phosphorylcholine (co)polymer or a dispersant binding thereto at least one kind selected from a group consisting of P—OH group, —COOH group, —SO$_3$H group and/or a metal salt group thereof and imidazoline group.

<Claim 2>

The nanofiber dispersion according to claim 1, wherein the nanofibers are cellulose nanofibers.

<Claim 3>

The nanofiber dispersion according to claim 2, wherein an average diameter of the cellulose nanofibers is 10-100 nm.

<Claim 4>

The nanofiber dispersion according to any one of claims to 3, wherein (meth)acryloyloxyethyl phosphorylcholine (co)polymer constituting the dispersant is at least one kind selected from a group consisting of polymethacryloyloxyethyl phosphorylcholine, polybutylmethacrylatefmethacryloyloxyethyl phosphorylcholine and polystearylmethacrylate-methacryloyloxyethyl phosphorylcholine.

<Claim 5>

The nanofiber dispersion according to any one of claims 1 to 3, wherein the dispersant is at least one kind selected from a group of dispersants consisting of phosphoric acid or polyphosphoric acid, a salt of phosphoric acid or a salt of polyphosphoric acid, polyacrylic acid, polyacrylic acid copolymer, a salt of polyacrylic acid, a salt of polyacrylic acid copolymer, a copolymer containing an olefin (a) and an unsaturated carboxylic acid (salt) (b) as essential constituent monomers, alkyl imidazoline compound and a dispersant having acid value and amine value.

<Claim 6>

The nanofiber dispersion according to any one of claims 1 to 5, wherein the dispersant contains 0.01-10% by weight of the nanofibers and 0.1-50% by weight of the dispersant based on the nanofibers.

<Claim 7>

A method of producing the nanofiber dispersion according to any one of claims 1 to 6 comprising treating the dispersant containing a raw material of the nanofibers and a dispersant with a Medialess disperser.

<Claim 8>

Powdery nanofibers dried the nanofiber dispersion according to any one of claims 1 to 7, wherein the powdery nanofibers comprise blending 1-40% by weight of a dispersant (B) in terms of solid content based on the powdery nanofibers (A) and has a bulk density of 90-200 g/L.

<Claim 9>

A method of producing the powdery nanofibers according to claim 8, the method comprises drying a dispersion of the nanofibers (A) comprising containing the dispersant (B) therein, having a −20~−50 mV of zeta potential and further being dispersed with the Medialess disperser.

<Claim 10>

A method of producing the powdery nanofibers according to claim 9, wherein the drying of the dispersion is freeze drying, reduced pressure drying, heat drying or spray drying.

<Claim 11>

A method of producing the powdery nanofibers according to claim 10, wherein the drying of the dispersion is freeze drying.

<Claim 12>

A method of producing the powdery nanofibers according to any one of claims 9 to 11 comprising performing further pulverizing after drying.

<Claim 13>

A composition comprises as main components the powdery nanofibers composed of the nanofibers (A) and the dispersant (B) according to claim 8 and further a matrix component selected from (C) a thermoplastic resin (C-1), a thermosetting resin (C-2) and a rubber (C-3).

<Claim 14>

The composition according to claim 13, wherein the thermoplastic resin (C-1) is at least one kind selected from a group consisting of polyethylene resin, polypropylene resin, polylactic acid resin, polyvinyl alcohol resin, polyamide resin, acrylonitrile-butadiene-styrene (ABS) resin, acrylonitrile-styrene (AS) resin, polymethyl methacrylate resin, polyvinilydene chloride resin, ethylene vinyl alcohol resin, polyacrylonitrile resin, polyacetal resin, polyketone resin and cyclic polyolefin resin.

<Claim 15>

The composition according to claim 13, wherein the thermosetting resin (C-2) is at least one kind selected from a group consisting of phenol resin, urea resin, melamine resin, benzoguanamine resin, alkyd resin, unsaturated polyester resin, vinyl ester resin, diallyl (tere)phthalate resin, epoxy resin, silicone resin, urethane resin, furan resin, ketone resin, xylene resin and thermosetting polyimide resin.

<Claim 16>

The composition according to claim 13, wherein the rubber (C-3) is at least one kind selected from a group consisting of natural rubber (NR), polyisoprene rubber (IR), styrene-butadiene-copolymer rubber (SBR), polybutadiene rubber (BR), butyl rubber (IIR), nitrile rubber (NBR), chloroprene (CR), acryl rubber (ACM) and fluororubber (FKM).

<Claim 17>

The composition according to any one of claims 13 to 16, wherein the composition comprises 0.5-20% by weight of the cellulose nanofibers (A), 0.0005-10% by weight of the dispersant (B) in terms of solid content and 70-99.4995% by weight of the matrix component (C) (provided that (A)+(B)+(C)=100% by weight).

<Claim 18>

A molded article comprises molding the composition according to any one of claims 13 to 17.

<Claim 19>

A molding material used for a 3D printer, which comprises as main components either the nanofibers (A), the dispersant (B) and the thermoplastic resin (C-1) or the nanofibers (A), the dispersant (B) and a resin component (C-4) comprising a photo-curable resin, each according to any one of claims 13 to 17.

<Claim 20>

The molding material according to claim 19 comprises 0.5-20% by weight of the nanofibers (A), 0.0005-10% by weight of the dispersant (B) and 70-99.4995% by weight of the resin component (C) (provided that (A)+(B)+(C)=100% by weight).

<Claim 21>

A method of producing the molding material for a 3D printer comprises melt-excluding the molding material according to claim 19 or 20, followed by cooling and solidifying it in a liquid bath to form a monofilament.

<Claim 22>

A three dimensional molded article obtained by applying a 3D printer using the molding material according to claim 19 or 20.

Effects of the Invention

The nanofibers dispersion of the present invention is a dispersion dispersed satisfactorily nanofibers such as cellulose nanofibers, and the like.

Also, in the powdery nanofibers of the present invention, since nanofibers (A) such as cellulose nanofibers, and the like, are dispersed uniformly in a matrix component (C) by the action of a dispersant (B) so that the entanglement of the nanofibers may be undone in nanometer level to be a powdery form of the nanofibers original appearance, whereby it is possible to provide a composition capable of increasing the uniformity, strength, flexural modulus, transparency, low linear thermal expansion property, surface appearance, shape accuracy, and the like, of the composition obtained.

Further, in the molding material of the present invention, since the nanofibers (A) such as the cellulose nanofibers, and the like, are dispersed uniformly in the matrix component (C) by the action of the dispersant (B) so that the entanglement of the nanofibers may be undone in nanometer level to be a powdery form of the nanofibers original appearance, and the aggregation due to the hydrogen bonding of cellulose hydroxyl groups is blocked, the strength and the flexural modulus are improved, and moreover, since the nanofibers are dispersed, it is possible to reproduce more accurately the designed shape as a modeled object, which is excellent in the surface smoothness, and furthermore, when the cellulose nanofibers are used as the nanofibers, it is possible to obtain a three-dimensional modeled article excellent in the transparency and dyeability having a smaller diameter of the dispersed cellulose nanofibers than the wavelength of the light and also having high dyeability due to the cellulose, which is suitable as the molding material for 3D printers.

BRIEF DESCRIPTION OF THE DRAWINGS

FIG. 1: FIG. 1 is a photograph of a 3D printer model (shaped object) (M16 hexagon bolt) used for measuring the magnitude of thread displacement in Examples 34 to 36 and Comparative Examples 25 to 26.

MODE FOR CARRYING OUT THE INVENTION

<A) Nanofiber>

Nanofiber is a general term for fibers having a diameter of 1 to 1,000 nm and a length of 100 times or more of the diameter in general. The material of the nanofibers illustrates preferably bio nanofibers (cellulose nanofibers, chitin-chitosan nanofibers), carbon nanofibers, other nanofibers (inorganic nanofibers other than carbon, organic polymer nanofibers), and the like, more preferably the cellulose nanofibers. Hereinafter, the nanofibers (A) will be described in detail using the cellulose nanofibers as an example.

<Raw Material of Cellulose Nanofibers>

The raw material of cellulose used for producing the cellulose nanofiber dispersion of the present invention may be in any form such as fibrous, granular, and the like. The cellulose raw material is preferably crystalline cellulose from which lignin or hemicellulose has been removed. Also, commercially available raw materials may be used. When cellulose is treated with the Medialess disperser, the cellulose becomes thinner, as the entanglement between fibers are fibrillated while maintaining the length of the fiber, but it is also possible either to cut the fiber or to decrease the molecular weight by changing the treatment conditions. Incidentally, in the present invention, the term "nanofiber" means a fiber whose width is nano-sized. For example, in the cellulose, between fibers are unraveled (fibrillated) by the method of the present invention, and its diameter becomes about 10 to 50 nm. The diameter (width) of the cellulose raw material or nanofiber can be measured by an electron micrograph. Such fibers are not nano-sized in length but are nano-sized in diameter (width), so they are referred to as the nanofibers in the present invention.

<Dispersant>

As the dispersant used in the present invention, there can be illustrated a (meth)acryloyloxyethyl phosphorylcholine (co)polymer.

Here, (meth)acryloyloxyethyl phosphorylcholine is a term over methacryloyloxyethyl phosphorylcholine and acryloyloxyethyl phosphorylcholine. These are prepared according to a conventional method. That is, for example, there is obtained the former by reacting 2-bromoethylphosphoryl dichloride, 2-hydroxyethyl phosphoryl dichloride and 2-hydroxyethyl methacrylate to give 2-methacryloyl-oxyethyl-2-bromoethylphosphoric acid, which is further reacted with trimethylamine in a methanol solution.

As a method for preparing a polymer (homopolymer) using such (meth)acryloyloxyethyl phosphorylcholine (hereinafter referred to as "MPC"), it is preferable to follow the usual polymerization method. For example, there is obtained MPC by polymerizing these monomers in a solvent in the presence of a polymerization initiator. The solvent to be used here may be any one as long as it dissolves MPC, and particularly, includes water, methanol, ethanol, propanol, t-butanol, benzene, toluene, dimethylformamide, tetrahydrofuran, chloroform or a mixed solvent thereof, and the like. As the polymerization initiator, any conventional radical initiator may be used. Examples of the polymerization initiator include a fatty acid azo compound such as 2,2'-azobisisobutyronitrile (AIBN), 3-carboxypropionitrile, azobismarrenonitrile, and the like, as well as organic peroxides such as benzoyl peroxide, lauroyl peroxide, potassium persulfate, and the like.

In the case of preparing the copolymer ((co)polymer), in addition to these monomers, an arbitrary monomer can be further added thereto and polymerized in the same manner. As examples of the arbitrary monomers, there can be preferably exemplified as follows: alkyl (meth)acrylate such as methyl acrylate, methyl methacrylate, ethyl acrylate, ethyl methacrylate, propyl acrylate, propyl methacrylate, butyl acrylate, butyl methacrylate, lauryl acrylate, lauryl methacrylate, cetyl acrylate, cetyl methacrylate, stearyl acrylate, stearyl methacrylate, isostearyl acrylate, isostearyl methacrylate, oleyl acrylate, oleyl methacrylate, (meth) acrylic acid or salts thereof, such as acrylic acid, methacrylic acid, and the like, as well as polyoxyalkylene-modified (meth) acrylate such as polyoxyethylene acrylate, polyoxyethylene methacrylate, polyoxypropylene acrylate, polyoxypropylene methacrylate, and the like. Further, the method of copolymerization is not particularly limited as far as it is generally known, and random copolymerization, block copolymerization, and the like, can be preferably exemplified.

Some of such polymers or copolymers are already on the market, and such commercially available products can also be purchased and used. Examples of such commercially available products include "LIPIDURE PMB" (manufactured by NOF CORPORATION), which is a polymethacryloyloxyethyl phosphorylcholine, "Lipidure HM" (manufactured by NOF CORPORATION), methacryloyloxyethyl phosphorylcholine•butyl methacrylate copolymer "LIPIDURE NR" (manufactured by NOF CORPORATION), which is methacryloyloxyethyl phosphorylcholine-stearyl methacrylate copolymer, and the like, can be preferably exemplified.

As the dispersant (B), there can be used at least one kind selected from a group consisting of P—OH group, —COOH group, —SO$_3$H group, and/or a metal salt group each thereof, and imidazoline group.

As specific examples of the dispersant (B), any one may be used, as long as it can disperse the cellulose nanofibers (A). For example, there can be cited at least one kind selected from a group consisting of phosphoric acid or polyphosphoric acid, a salt of phosphoric acid or a salt of polyphosphoric acid, polyacrylic acid, polyacrylic acid copolymer, a salt of polyacrylic acid, a salt of polyacrylic acid copolymer, and copolymers containing an olefin (a) and an unsaturated carboxylic acid (salt) (b) as essential constituent monomers (for details, refer to JA-A-2015-196790), alkylimidazoline compounds (for details, refer to JP-A-2015-934 and JP-A-2014-118521), as well as a dispersant having an acid value and an amine value (for details, refer to JA-A-2010-186124), and in particular, an anionic dispersant such as phosphoric acid, polyphosphoric acid, each salt of phosphoric acid or polyphosphoric acid, polyacrylic acid, polyacrylic acid copolymer, a salt of polyacrylic acid, and the like, is preferred.

Specific examples of such anionic dispersant include pyrophosphoric acid, polyphosphoric acid, tripolyphosphoric acid, tetrapolyphosphoric acid, metaphosphoric acid, trimetaphosphoric acid, tetrametaphosphoric acid, hexametaphosphoric acid, polyacrylic acid, polymethacrylic acid, polyitacone, orthosilicic acid, metasilicic acid, phosphonic acid, polymaleic acid copolymer, humic acid, tannic acid, dodecylsulfuric acid, dodecylbenzenesulfonic acid, polystyrenesulfonic acid, ligninsulfonic acid, sulfonic acid group bonded polyester and and/or a salt thereof. They are not limited to homopolymers, and copolymers are also preferred. For example, other monomers can be copolymerized with the polyacrylic acid or polymethacrylic acid. Examples of such monomers include unsaturated carboxylic acids and salts thereof such as α-hydroxyacrylic acid, crotonic acid, maleic acid, itaconic acid and fumaric acid, 2-acrylamido-2-methylpropanesultonic acid, and unsaturated sulfonic acids and salts thereof such as methallylsulfonic acid and styrenesulfonic acid, and the like.

The dispersant may be used alone or in combination of two or more. Preferred dispersants include polyphosphoric acid, polyacrylic acid, polymethacrylic acid, polyaniline sulfonic acid and copolymers thereof and/or salts thereof. As the salt, an alkali metal salt such as sodium, potassium or lithium, a salt of a Group 2 element such as calcium or magnesium, or an ammonium salt is preferably exemplified, and from the viewpoint of solubility in water, sodium salt, potassium salt, and ammonium salt are more preferably, and most preferred is the potassium salt.

Specific examples of such a dispersant include A-6144 (carboxylic acid type dispersant) manufactured by Toagosei Co., A-6012 (sulfonic acid type dispersant) manufactured by Toagosei Co., Ltd., Demol NL (Sulfonic acid type dispersing agent), SD-10 (polyacrylic acid type dispersing agent) manufactured by Toagosei Co., Ltd., and the like.

In the nanofiber dispersion of the present invention, it may be possible to add thereto a small amount of an acid such as phosphoric acid, citric acid, acetic acid, and malic acid, or an alkali such as sodium hydroxide and potassium hydroxide, sodium carbonate, potassium carbonate, sodium hydrogen carbonate and potassium hydrogen carbonate.

<Dispersion Medium>

As examples of the dispersion medium for the nanofiber dispersion, there can be cited water, lower alcohols (methanol, ethanol, propanol, isopropanol), glycols (ethylene glycol, propylene glycol, diethylene glycol), glycerin, acetone, dioxane, tetrahydrofuran, acetonitrile, dimethylformamide, dimethyl Sulfoxide, acetamide, and the like, and these can be used alone or in combination of two or more kinds. Preferable examples of the dispersion medium include water and a water-containing solvent, and water is most preferable.

<Composition of Dispersion>

In the dispersion of the present invention, the nanofibers are contained preferably in the range of 0.1 to 10% by weight, more preferably 0.5 to 5.0% by weight, still more preferably 1.0 to 3.0% by weight, and the dispersant is contained to the nanofiber (solid content weight), preferably 0.1 to 50% by weight, more preferably 1 to 20% by weight, still more Preferably 5 to 20% by weight. Disperse medium of the nanofiber dispersion is contained preferably 50 to 99.9% by weight, more preferably 60 to 99.5% by weight, and still more preferably 70 to 99% by weight.

The nanofiber dispersion of the present invention preferably contains 0.01 to 0.4 parts by weight, more preferably 0.02 to 0.3 parts by weight, still more preferably 0.03 to 0.25 parts by weight, and most preferably about 0.05 to 0.2 parts by weight of the dispersant, with respect to 1 part by weight of the nanofibers. If the amount of the dispersant is too large or too small, the precipitation of the cellulose nanofibers tends to occur.

<Nanofibers>

The nanofibers such as the cellulose nanofibers obtained by the present invention have a fiber diameter of 100 nm or less, more preferably 80 nm or less, further preferably 60 nm or less, particularly 40 nm or less. The nanofibers of the present invention are substantially free of the cellulose, where the fiber diameter is very small and the cellulose insufficiently fibrillated is not substantially present, have an appearance close to a transparent solution, when dispersed in water, whereby not observed macroscopically the nanofibers dispersed, and it is possible to obtain a transparent dispersion (in the case of low concentration) or transparent gel or opaque gel (in the case of high concentration). The "dispersion" of the present invention includes various forms such as an aqueous dispersion, a water-dispersed gel, and a water-dispersed paste. By increasing the number of times of high pressure injection processing, an opaque gel can be made into a transparent gel.

For example, it is known that the flexural modulus and strength of the cellulose nanofibers composed of extended chain crystals reach 140 GPa and 3 GPa, respectively, which are equal to typical high-strength fibers, Aramid fibers, and are more flexural than glass fibers. Moreover, the coefficient of linear thermal expansion is $1.0 \times 10^{-7}/°$ C., which is a low comparable to quartz glass. Since the aqueous dispersion of the cellulose nanofibers of the present invention is excellent in the dispersibility of the nanofibers, it is also useful as a reinforcing fiber for composites.

<Method of Manufacturing Dispersion>

The dispersion of the present invention can be produced as a stable dispersion by feeding raw materials of the nanofibers, for example, cellulose, a dispersant, and a dispersion medium to a mechanical fibrillating step and mechanically fibrillating the cellulose to the nanofibers.

Incidentally, hereinafter, as a specific example of the nanofibers of the present invention, cellulose nanofibers are sometimes described as an example Although examples of the mechanical fibrillating means include a grinder, a kneading machine, a beads mill, a high pressure homogenizer, a counter underwater counter, a high speed rotary disperser, a beadless disperser, a high speed agitating type Medialess disperser, and the like, preferably, high speed agitating type Medialess disperser is most preferable.

The Medialess disperser makes it possible to obtain a highly pure cellulose nanofiber dispersion with little contamination of impurities.

The high speed agitating type Medialess disperser means a disperser that performs dispersion processing utilizing shearing force substantially without using dispersion media (for example, beads, sand (grit), balls, and the like).

Examples of the Medialess disperser include, but are not limited to, DR-PILOT 2000, ULTRA-TURRAX series, Dispax-Reactor series, manufactured by IKA Works GmbH & Co. KG; T. K. Homomixer, T. K. Pipeline Homomixer, manufactured by PRIMIX CORPORATION; High Shear Mixer, manufactured by Silverson Machines, Inc.; Milder, Cavitron, manufactured by Pacific Machinery & Engineering Co., Ltd.; Cleatmix, manufactured by M Technique Co., Ltd.: Quick Homomixer, Disper Mixer, manufactured by Mizuho Industry Co., Ltd.; Apex Disperser Zero (K-2: Prototype No.), manufactured by Hiroshima Metal & Machinery Co., Ltd., and the like.

Among them, as the Medialess disperser, a disperser having a rotor and a stator is preferable. As an example of such a high speed agitating type Medialess disperser, there is mentioned a disperser, manufactured by Hiroshima Metal & Machinery Co., Ltd. This disperser comprises a stator and a rotor rotating inside the stator. A gap is formed between these stators and the rotor. A shearing force can be applied by rotating the rotor and allowing the mixture liquid to pass between the stator and the rotor. The distance between the stator and the rotor is defined as a shear clearance.

Further, the disperser is not limited to the above-described one, and for example, a disperser in which the stator and the rotor are installed in multiple stages may be used.

As the Medialess disperser of the present invention, from the viewpoint of processing uniformly, it is preferable to use an inline circulating type in which the mixed solution is circulated in the disperser.

The shear rate in the Medialess disperser exceeds 900,000 [l/sec]. When the shear rate is 900,000 [l/sec] or less, the cellulose is not disintegrated.

The shear rate is preferably 2,000,000 [l/sec] or less, more preferably 1,500,000 [l/sec] or less, and more preferably 1,200,000 [l/sec] or less.

The shear clearance of the Medialess disperser is appropriately set according to the above-described shear rate, but from the viewpoint of obtaining the optimum pigment particle diameter, the shear clearance is preferably 10 µm or more, more preferably 15 µm or more, further preferably 20 µm or more preferable. From the viewpoint of keeping the rotational speed of the disperser at an appropriate value, the clearance is preferably 100 µm or less, more preferably 50 µm or less, and still more preferably 40 µm or less.

Further, the rotational peripheral speed of the Medialess disperser is appropriately set according to the above shear rate, but from the viewpoint of obtaining the optimal cellulose nanofibers, it is preferably 18 m/s or more, more preferably 20 m/s or more, still more preferably 23 m/s or more. From the viewpoint of obtaining the optimum cellulose nanofiber diameter, the rotational peripheral speed is preferably 50 m/s or less, more preferably 40 m/s or less, and still more preferably 35 m/s or less. The rotational peripheral speed is the peripheral speed of the cutting edge part of the rotor.

As described above, the dispersion of the cellulose nanofibers of the present invention can be produced by treating the dispersion containing the cellulose and the dispersing agent once or several times with the above-mentioned high speed agitation type Medialess disperser.

The average fiber diameter of the cellulose nanofibers obtained by the treatment according to the method of the present invention is about 10 to 100 nm, preferably about 10 to 40 nm, and most preferably about 15 to 25 nm. Since the nanofibers of the present invention have a large fiber length and fiber width (aspect ratio) and are in a well dispersed state, it is easy to mold into a film sheet shape where the nanofibers are intertwined like a nonwoven fabric while maintaining the strength thereof, thereby making it possible to suitably use as various materials. The nonwoven fabric obtained by forming the aqueous dispersion of the cellulose nanofibers of the present invention into a film or sheet has a feature of high transparency. Since the dispersant above has biocompatibility similarly to the cellulose nanofibers, the dispersion can be suitably used for medical or food applications.

Zeta potential measurement (measuring method described below) of the dispersion thus obtained is preferably −20 to −50 mV, preferably −30 to 40 mV. Below −20 mV, heterogeneous dispersion occurs and the cellulose nanofibers settle. On the other hand, when it exceeds −50 mV, the cellulose nanofibers break and precipitate without forming a sufficient network structure.

<Method of Producing Powdery Nanofibers>

The powdery nanofibers of the present invention can be obtained by subjecting a dispersion (emulsion or slurry) containing nanofibers (A) and a dispersion (B) as main components to freeze drying, vacuum drying, heat drying, or spray drying.

In this manufacturing method, first, the dispersion containing the nanofibers (A) such as the cellulose nanofibers, and the like, and the dispersant (B) is dried. This drying step is a step for removing the dispersion medium in the dispersion. Therefore, a known method can be adopted depending on the type of dispersion medium in the dispersion.

As a means for removing the dispersion medium, there is selected an appropriate one, according to the kind of the dispersion medium. For example, it may be natural drying just by allowing the dispersion to stand at room temperature, or a known drying method such as heat drying, vacuum drying (reduced pressure drying), freeze drying, spray drying, or the like, may be used. Spray drying is performed by ejecting the dispersion from a nozzle to form fine droplets and then heating and drying the droplets in convection air.

Particularly, in the case of using natural drying or heat drying, from the viewpoint of drying efficiency, it is preferable to cast the mixture into a film or sheet form and then to dry the molded article.

As the drying means, freeze drying is preferable from such a viewpoint that in particular, the deterioration of the quality of the obtained dried product is small, whereby the dried body is in the form of a fine cut fiber and the handling in a subsequent processing step, or the like, is convenient and easy.

Here, freeze drying is a method of freezing the dispersion above and then drying by allowing the dispersion medium to sublime by depressurizing it while frozen. There are no particular restrictions on the method of freezing the dispersion in the freeze drying, but, for example, a method of freezing the dispersion by placing the dispersion in a refrigerant, a method of freezing the dispersion by placing the dispersion in a low-temperature atmosphere, a method of placing the dispersion under reduced pressure. It is preferable to allow the dispersion to freeze by placing it in a refrigerant. The freezing temperature of the dispersion must be equal to or lower than the freezing point of the dispersion medium in the dispersion, and is preferably −50° C. or lower, more preferably 80° C. or lower.

In the freeze drying, the dispersion medium in the frozen dispersion must be sublimed under a reduced pressure. The pressure at the time of depressurization is preferably 100 Pa or less, and more preferably 10 Pa or less. When the pressure exceeds 100 Pa, there is a possibility that the dispersion medium in the frozen dispersion melts.

In the present invention, "powdery" nanofibers refer to a state where the nanofibers having a solid form have been finely pulverized, but as far as the "bulk density" of the present invention is satisfied, the solid matter after drying is in the form of a membrane, sheet shape, three-dimensional shape, and the like, should be interpreted as broadly encompassed in this "powdery state," but considering the dispersibility in the resin in the melt-kneading process described below, finely crushed material is preferable.

The form of the solid matter (dried product) of the dispersion thus obtained is not particularly limited, and it can be, for example, three-dimensional, membrane, sheet, powdery or granular. The form of this solid matter can be adjusted by appropriately selecting the method of removing the dispersion medium from the mixture in the above-described production method. For example, by casting (founding) the dispersion and drying thereof, it is possible to obtain a gelatinous body in a form of a film or a sheet, as well as by spray drying the dispersion, it is possible to obtain a powdery or granular gel-like body. Further, a dried product having a three-dimensional shape can be produced by pouring the dispersion into a mold having an arbitrary shape and drying thereof.

Pulverizing:

In the powdery nanofibers of the present invention, when the dried product obtained as described above is in the form of sheet, granule, membrane, three-dimensional, and the like, it is pulverized using a pulverizer to obtain powder.

As this pulverizer, there is selected, for example, from a rotary mixer having blades capable of high speed rotation. This high speed rotary mixer is not particularly limited as far as it is capable of pulverizing and mixing with impact and shearing force generated by a blade rotating at high speed, and it may be a known one. For example, a Henschel mixer, a speed mixer, a cutter mixer, and the like, are preferable, but a cutter mixer where the rotary blade has a sharp cutter shape is particularly preferable. The pulverizing conditions by using the blades in the high speed rotary mixer are such that the blade has a rotation speed of 2000 rpm or more or a peripheral speed of 50 m/sec or more, particularly a rotation speed in a range of 3,000 to 20,000 rpm or a peripheral speed in a range of 70 to 115 m/sec is preferable.

It is preferable that the pulverized material above is recovered by a cyclone, a bag filter, or the like, while being cooled to 20° C. or less. Thus, the powdery nanofibers of the present invention can be obtained.

Incidentally, as described below, in the case of the thermoplastic resin composition of the present invention containing the components (A) to (C) as main components, there is carried out pelletization through a usual melt extruder and then followed by melt-molding such as extrusion molding, injection molding, transfer molding, melt-molding, melt spinning, or the like. Of course, it is also possible to carry out the melt-molding by either directly using the resin composition pulverized and/or mixed in a high speed rotary mixer without the pelletization as a molding material, or by compacting the powder composition with a compactor to make it bite into the powder composition with a molding machine hopper. Alternatively, the composition of the present invention can be further granulated and used as a material for powder molding or coating.

The "bulk density" of the powdery nanofibers of the present invention is usually 90 to 200 g/L, preferably 95 to 170 g/L, more preferably 100 to 150 g/L. Incidentally, the dried powdery nanofibers of the present invention have a highly micro-fibrillated form and contain less fiber entanglement, whereby there are many cases not containing fiber aggregates agglomerated or intertwined in bulk form (bulky dried matter). That is, the powdery nanofibers of the present invention usually have a powdery form.

<(C) Matrix Component>

As the matrix component (C) used in the composition of the present invention, thermoplastic resin (C-1), thermosetting resin (C-1), or rubber (C-3) can be mentioned.

(C-1) Thermoplastic Resin:

Here, the thermoplastic resin refers to a resin that performs melt-molding by heating. Specific examples thereof include at least one kind of resin selected from a group consisting of polyethylene resin, polypropylene resin, polylactic acid resin, polyvinyl alcohol resin, polyamide resin, acrylonitrile-butadiene-styrene (ABS) resin, acrylonitrile-styrene (AS) resin, polymethyl methacrylate resin, polyvinylidene chloride resin, ethylene vinyl alcohol resin, polyacrylonitrile resin, polyacetal resin, polyketone resin and cyclic polyolefin resin.

Incidentally, in the resin composition of the present invention, when the cellulose nanofibers are used as the nanofibers (A), the heat resistance may not be sufficient in some cases, so that there are particularly preferably used as thermoplastic resins (C-1) having a relatively low melting point such as polyethylene resins, polypropylene resins, polylactic acid resins, polyvinyl alcohol resins, and among polyamide resins, nylon 6, and the like.

Also, as resins synthesized tram biomass-derived monomers, in addition to polylactic acid resins, there are suitably used polybutylene succinate, polytrimethylene terephthalate, biomass-derived polyol, biomass-derived polyamide, biomass-derived polyglycolic acid resin, biomass-derived polyethylene, biomass-derived polyethylene polyethylene terephthalate, biomass-derived polycarbonate and derivatives thereof.

Furthermore, polyamide 11, polyamide 610, polyamide 1010, polyamide 1012 and derivatives thereof are preferably used as the biomass-derived polyamide.

(C-2) Thermosetting Resin:

In the resin composition of the present invention, when the thermosetting resin (C-2) is used as the matrix component (C), the thermosetting resin is uniformly mixed with the cellulose nanofibers in the resin composition of the present invention. It exists in a dispersed state. The type of the thermosetting resin is not particularly limited.

Examples of thermosetting resins include epoxy resins, phenolic resins, melamine resins, urea resins, unsaturated polyester resins, and the like. These thermosetting resins may be used singly or in combination of two or more. Among these thermosetting resins, it is particularly preferable to use an epoxy resin from the viewpoint of the further higher uniform dispersibility with the cellulose nanofibers.

(C-3) Rubber:

Examples of the rubber to be used include natural rubber (NR), polyisoprene rubber (IR), styrene-butadiene copolymer rubber (SBR), polybutadiene rubber (BR), butyl rubber (IIR), nitrile rubber (NBR), chloroprene rubber (CR), acrylic rubber (ACM), fluororubber (FKM), ethylene propylene rubber (EPDM), chlorosulfonated polyethylene (CSM), urethane rubber (U), silicone rubber (Q), and the like.

Incidentally, it is preferable that the rubber composition of the present invention is usually produced from a cellulose nanofibers-containing master batch. Specifically, it is manufactured by vulcanizing the cellulose nanofibers-containing rubber master batch or, if necessary, adding a rubber component to the cellulose nanofibers-containing rubber master batch and thereafter vulcanizing it.

Also, it can be obtained by mixing other compounding agents conventionally used in the rubber industry using a known method such as a rubber kneader before vulcanization, molding, and vulcanizing reaction by a known method. As a compounding agent, there can be illustrated inorganic and organic fillers such as silica particles, carbon black and fibers, a silane coupling agent, a vulcanizing agent, a stearic acid, a vulcanization accelerator, a vulcanization acceleration aid, an oil, a cured resin, a wax, anti-aging agents, and the like.

Among them, an organic peroxide or a sulfur-based vulcanizing agent can be used as the vulcanizing agent. As the organic peroxides, although various organic peroxides conventionally used in the rubber industry can be used, dicumyl peroxide, t-butyl peroxybenzene and di-t-butylperoxy-diisopropylbenzene are particularly preferred. As the sulfur-based vulcanizing agent, for example, sulfur, morpholine disulfide, and the like, can be used, and among them, sulfur is preferable. One kind of these vulcanizing agents may be used alone, or two or more kinds of these vulcanizing agents may be used in combination.

The blending amount in the rubber composition is usually 7.0 parts by weight or less, preferably 6.0 parts by weight or less in the case of sulfur with respect to 100 parts by weight of the rubber component. In the case of the organic peroxide, it is usually at least 1.0 part by weight, preferably at least 3.0 parts by weight, and more preferably at least 4.0 parts by weight.

The conditions of the vulcanization step are not particularly limited and may be any temperature as long as it is equal to or higher than the temperature at which the rubber component can be vulcanized. In particular, the heating temperature is preferably 60° C. or higher, more preferably 100° C. or higher. From the viewpoint of suppressing decomposition of the fine cellulose fibers, the heating temperature is preferably 250° C. or less, more preferably 200° C. or less. From the viewpoint of productivity and the like, the heating time is usually 5 minutes or more, preferably 10 minutes or more, more preferably 15 minutes or more, and still preferably 180 minutes or less. The heat treatment may be carried out by changing the temperature and heating time over several times.

Incidentally, in the composition of the present invention, when "(meth)acryloyloxyethyl phosphorylcholine (co)polymer" or the other dispersant described above is used as the dispersant (B), the compatibility of the cellulose nanofibers (A) with the matrix component (C) (thermoplastic resin, thermosetting resin, or rubber) is further improved, so that it is possible to obtain the resin composition where both the component (A) and the component (C) are uniformly dispersed.

Further, by adding a surfactant to the composition of the present invention in an amount of several tens to 100 ppm, the wettability, permeability and leveling property of the coating film are improved, and the surface of the coating film can be smoothed. As a preferable surfactant, a fluorine-based surfactant (Surflon S-231, manufactured by Asahi Glass Seimi Chemical Co., Ltd.) can be mentioned.

Although the description has made of thermoplastic resin (C-1), thermosetting resin (C-2) or rubber (C-3) as the matrix component (C) in the above, further photocurable resin (C-4) can be used together with these (C-1) to (C-3) or alone as the matrix component (C).

Details of the photocurable resin (C-4) will be described later in the section "Building Material for 3D Printer."

<Ratio of Each Component in Resin Composition>

The composition of the present invention usually contains 0.5 to 20% by weight, preferably 1 to 10% by weight of the nanofibers (A) such as the cellulose nanofibers, and the like, 0.0005 to 10% by weight, preferably 0.001 to 5% by weight of the dispersant (B) in terms of solid content, and 70 to 99.4995% by weight, preferably 85 to 98.999% by weight of the matrix component (C) [provided that (A)+(B)+(C) =100% by weight].

If the component (A) is less than 0.5% by weight, the strength and dimensional stability of the composition obtained will be lowered and it will be difficult to differentiate it from resin alone, whereas exceeding over 20% by weight, the melt viscosity will be high, whereby the moldability of the obtained resin composition is inferior, the dispersibility of the cellulose nanofibers is poor, and aggregates are large, thereby making it difficult to uniformly disperse.

Also, when the amount of the dispersant (B) used is less than 0.0005% by weight, the dispersion of the nanofibers (A) such as the cellulose nanofibers, and the like, becomes poor and its compatibility with the matrix component (C) decreases. On the other hand, when it exceeds 10% by weight, only the dispersant dissolves in the matrix component, and physical properties such as mechanical properties, and the like, are deteriorated.

Further, if the matrix component (C) is less than 70% by weight, the melt viscosity becomes high and the formability is inferior, and the composite material cannot be obtained in the kneading step of the composition. On the other hand, if the matrix component exceeds 99.4995%, it becomes difficult to differentiate it from the single component.

Still further, as a specific example in this case, a mention may be made of kneading the nanofibers such as powdery cellulose nanofibers composed of the nanofibers (A) and the dispersant (B) as main components with the matrix component (C).

<Method of Producing Composition>

The composition of the present invention can be produced using the powdery nanofibers obtained as described above and a thermoplastic resin, a thermosetting resin or a rubber.

In this case, in the method of producing the composition of the present invention, the powdery nanofibers containing the nanofibers (A) and the dispersant (B) as main components are kneaded with the matrix component (C).

Specifically, as a specific example in this case, after freeze drying, reduced pressure drying, heat drying or spray drying a dispersion (emulsion or slurry) mainly composed of the nanofibers (A) and the dispersing agent (B), if necessary, further pulverization is carried out with a pulverizer to form the powdery nanofibers, which are kneaded with the matrix component (C).

That is, the powdery nanofibers obtained as described above and the matrix component (C) are melt-kneaded. This melt-kneading is a step of compounding the powdery nanofibers obtained as described above and the matrix component (C) while melt-kneading.

As a melt-kneading apparatus, a known kneading apparatus such as a single-screw extruder, a twin screw extruder, a twin screw kneader, a kneader, a Banbury mixer, a reciprocating kneader (BUSS KNEADER) a roll kneader, or the like, can be used. Among them, in consideration of the productivity and convenience of the operation, a single screw extruder, a twin screw extruder, a twin screw kneader, a Banbury mixer and a reciprocating kneader are preferable. In selecting the melt-kneading apparatus, it is preferable to select a device having a high sealability inside the kneading machine, thereby making it possible to produce a cellulose nanofibers-containing composition having higher dispersibility, and besides having substantially no coarse aggregate.

As a specific melt-kneading method, for example, the following methods can be mentioned. That is, either a method of melt-kneading, in advance, the powdery cellulose nanofibers and the matrix component (C) are homogeneously mixed with a Turbler mixer, a super mixer, a super floater, a Henschel mixer, or the like, and then these are put into a single screw extruder or a twin screw extruder, or a method of melt-kneading the powdery cellulose nanofibers mentioned-above and the matrix component (C) with a single screw extruder or a twin screw extruder, or other methods. Incidentally, to remove moisture and other volatile components generated in the melt-kneading step, vent opening and degassing equipment may be used.

The temperature at the time of melt-kneading in the production of the composition of the present invention is appropriately set according to the melting temperature of the matrix component (C), but it is, for example, within a range of 70 to 220° C. In particular, when an olefinic resin is used as the matrix component (C), the kneading temperature is in a range of 70° C. to 220° C., preferably in a range of 80° C. to 220° C., more preferably 85° C. to 220° C. and still more preferably 90° C. to 200° C. Below this range, the resin to be kneaded does not melt and it is impossible to manufacture substantially. In the case where the nanofibers produced in the production is the cellulose nanofibers, the cellulose nanofibers (A) are damaged by heat, whereby there occur breakage rupture of the molecular chains, oxidation deterioration, denaturation, and the like, thereby causing not only the lowering of mechanical properties but also the generation of unpleasant odor and discoloration.

In this case, with respect to the melt-kneading time, although longer is preferable in view of ensuring the dispersibility of the cellulose nanofibers (A) and the dispersant (B) in the matrix component (C), this time is set as appropriate considering the balance with the productivity. For example, when using a batch type kneading machine such as a Banbury mixer, if the residence time is within a range of 1 to 100 minutes, although the modification of the plant fiber and the productivity thereof can be compatible, the production thereof is possible, even if the time is longer than this or even if the number of passes of the kneader is increased, in the case where the productivity is not taken into account. Further, when using a continuous kneading machine such as a single screw extruder, a twin screw extruder and a reciprocating kneader (BUSS KNEADER), if the residence time is within a range of 1 to 20 minutes, although the dispersibility and productivity can be compatible, the production thereof is possible, even if the time is longer than this or even if the number of passes of the kneader is increased, in the case where the productivity is not taken into consideration.

Incidentally, when using the thermosetting resin (C-2) as the matrix component (C), it is necessary to take measures not to cause thermal curing at this time of melt-kneading without adding a curing catalyst or a curing agent thereto.

Also, as a pulverizer after melt-kneading, there is used a common pulverizer for plastics having a rotary blade and a fixed blade, where a rotary blade rotates at a high speed and crushes, such as a hammer mill, a cutter mill, a pin mill, and the like. In particular, it is preferable to provide a mesh screen with a material outlet at the material outlet of the rotary pulverizer, which is capable of bringing the maximum grain size of the pulverized material below the desired level. This pulverizing means is also applied to the above-mentioned dried product.

The pulverized material thus obtained can be suitably used for a molding process generally used, that is, compression molding, transfer molding, injection molding, and the like.

<Other Additives>

Incidentally, the composition of the present invention may contain various conventionally known additives depending on the application thereof, and examples thereof include a hydrolysis inhibitor, a colorant, a flame retardant, an ultraviolet absorber, an antistatic agent, a lubricant, a releasing agent, a defoaming agent, a leveling agent, a light stabilizer (for example, hindered amine, and the like), an antioxidant, an inorganic filler, an organic filler, and the like.

<Molding>

The composition of the present invention obtained as described above is made into a molded article by various molding methods, but the molding method differs depending on the thermoplastic resin composition, the thermosetting resin composition, and further there are different aspects depending on the rubber composition, and it may be formed by properly separately selecting from the following molding methods.

That is, if plate-like products are produced from the composition of the present invention, an extrusion molding method is generally used, but a planar press is also possible. Besides this, it is possible to use a profile extrusion molding method, a blow molding method, a compression molding method, a vacuum molding method, an injection molding method, or the like. If a film-shaped product is to be produced, a solution casting method can be used in addition to a melt extrusion method, and in the case of using a melt-molding method, it is possible to use inflation film molding, cast molding, extrusion lamination molding, calendar molding, sheet molding, fiber molding, blow molding, injection molding, rotational molding, coating molding, and the like.

Also, in the case of a resin that is cured by active energy rays, a molded article can be produced by the use of various curing methods using active energy rays. In particular, there can be mentioned that when the cellulose nanofibers are added to a liquid thermoplastic resin, a molding method where a molding material is prepregged, and then pressurized and heated by a press or an autoclave. In addition to this, there can be illustrated RTM (Resin Transfer Molding) molding, VaRTM (Vaccum assist Resin Transfer Molding) molding, FW (Filament Winding) molding, laminate molding, hand lay-up molding, and the like.

<Molding Materials for 3D Printers>

Next, the molding material for a 3D printer of the present invention will be described in detail according to the constitutional requirements, but the molding material of the present invention is mainly composed of the nanofibers (A), a dispersant (B) and a resin component (C) made of a thermoplastic resin or a photo curing resin.

Incidentally, the thermoplastic resin among the nanofibers (A), the dispersing agent (B) and the component (C) is as described above.

As the photocurable resin (C-4) among the resin component (C), any of those used in the stereolithography method of 3D printers can be used, and examples thereof include polyester acrylate, polyurethane acrylate, a novolak type epoxy resin, a bisphenol type epoxy resin, and the like, to which an acetophenone type, benzoyl type, benzyl ketal type or ketone type photopolymerization initiator is added.

<Ratio of Each Component in Molding Materials>

The compounding ratio of each component in the molding materials of the present invention is usually, in terms of solid content, from 0.5 to 20% by weight, preferably from 1 to 10% by weight, of the cellulose nanofibers (A), from 0.0005 to 10% by weight, preferably from 1 to 10% by weight of the dispersant (B) and from 70 to 99.4995% by weight, preferably 85 to 98.999% by weight of the resin component (C) (provided that (A)+(B)+(C)=100% by weight).

If the component (A) is less than 0.5% by weight, the strength and dimensional stability of the resulting molding material are lowered, making it difficult to distinguish from the resin itself, whereas when it exceeds 20% by weight the melt viscosity will be high, the moldability of the molding material obtained is inferior, and the dispersibility of the cellulose nanofibers is inferior and the aggregate is large and it is difficult to uniformly disperse.

Also, if the amount of the dispersant (B) used is less than 0.0005% by weight, the dispersion of the cellulose nanofibers (A) becomes poor and the compatibility with the resin decreases, whereas when the amount of the dispersant is more than 10% by weight, only the dispersant is dissolved in the resin, and physical properties such as mechanical properties are deteriorated.

Further, when the content of the resin component (C) is less than 70% by weight, the moldability is inferior and the composite material cannot be obtained in the resin kneading step, whereas if it exceeds 99.4995% by weight, it is difficult to differentiate it from the resin alone.

<Preparation of Molding Materials>

The molding materials of the present invention are prepared using the dispersion obtained as described above and the resin component (C).

In this case, in the method of producing the resin composition of the present invention, the dispersion containing the nanofibers (A) and the dispersant (B) as main components is dried and kneaded with the resin component (C). As a specific example in this case, after freeze drying, reduced pressure drying, heat drying, or spray drying, a dispersion (emulsion or slurry) containing the nanofibers (A) and the dispersing agent (B) as main components is to be allowed to knead with the resin component (C).

Incidentally, the method of drying the dispersion, the method of kneading the powdery nanofibers and the resin component (C), and the formulation of other additives are as described above.

<Manufacturing Method of Molding Material>

The form of the molding material of the present invention is not limited as long as it can be mounted on a 3D printer, but when it is used for a 3D printer of a hot melt lamination type, for example, it is formed into a continuous linear shape. In this case, a shaped body having a diameter of 1.75 mm to 3.00 mm in the form of a so-called monofilament thread is preferable. A molded body exhibiting the form of a continuous linear monofilament yarn is preferably wound on a bobbin or formed into a hank shape so that it can be made into a compact form.

Such a molding material according to the present invention can be obtained by the following method. That is, the molding material (resin composition) prepared as described above is allowed to discharge from a melt extruder, followed by cooling and solidifying in the air or in a liquid bath such as water to produce possibly the objective molding material as a continuous linear monofilament yarn form.

Incidentally, to produce the molding material of the present invention, a resin composition containing the components (A) to (C) as main components may be melt-extruded as it is, but it is preferable to prepare a masterbatch blended, in advance, the nanofibers (A) such as the cellulose nanofibers, and the like, at high concentration and a dispersant (B) into a resin component (C), and followed by mixing this masterbatch and the resin component (C) such as polylactic acid, in virgin, and the like, at a predetermined ratio and melt extruding thereof, thereby making it possible to more uniformly disperse the nanofibers (A) into the resin component (C).

The melting temperature of the resin component (C) such as polylactic acid, and the like, in the melt extruder during melt extrusion is set up a temperature higher than 20° C. from the melting point of the resin component (C) (generally, in the case of polylactic acid, melting point is 150° C. to 180° C.), and then, the resin component (C) is melted and extruded. The resin component (C) (and the nanofibers) which has been extruded to become a continuous linear monofilament like filament is cooled and solidified in a liquid bath. The cooling and solidifying may be carried out at a temperature within a range of the set temperature of −50 to +20° C. from the glass transition temperature (generally, the glass transition temperature of polylactic acid is 55 to 60° C.) of the resin component (C).

As the liquid used for cooling and solidification, although there can be used water, ethylene glycol, polyethylene glycol, glycerin, silicone, and the like, water, which is good in workability and hardly causes environmental pollution, is most preferable, since there is no need to set the temperature of the liquid bath to high temperature. Water is most preferred.

The cooled and solidified monofilament yarn may be wound as it is after drying. Alternatively, it may be stretched in an atmosphere at a temperature of 20 to 80° C., if necessary. When stretching, it can be carried out in one stage or in multiple stages of two or more stages.

The molding material of the present invention can be applied as a molding material of a 3D printer, and a desired shaped object can be obtained based on a design drawing on a computer, or the like.

Incidentally, although the molding material of the present invention has mainly been described as the case of a 3D printer of the hot melt lamination type, it can also be applied to other materials such as material jetting, binder jetting, powder sintered laminated molding, optical shaping, and the like.

EXAMPLES

Hereinafter, the present invention will be described more specifically with reference to examples.

Examples 1 to 3, Comparative Examples 1 to 3

As a Medialess disperser, Apex Disperser Zero (K-2: Prototype No.), manufactured by Hiroshima Metal & Machinery Co., Ltd., was used, and a slurry, in which purified water as a dispersion medium, the cellulose nanofibers and a dispersant were dispersed, was charged to the Medialess disperser and circulated at a circumferential rotation speed of 30 m/s to promote dispersion and fibrillation of the cellulose by shearing to obtain a cellulose nanofiber dispersion with a stable dispersion.

That is, using the above-mentioned machine, an aqueous dispersion containing 0.1% by weight of the cellulose nanofibers (BiNFi-s, manufactured by Sugino Machine Co., Ltd.) and different concentrations (0.004% by weight to 0.01% by weight) of polymethacryloyloxyethyl phosphorylcholine (Lipidure HM, manufactured by NOF CORPORATION) was allowed to repeat the Medialess dispersing treatment 5 times to prepare a cellulose nanofiber dispersion, and the zeta potential and dispersibility were measured, whereby the sedimentation stability was visually evaluated. The results are shown in Table 1.

Incidentally, Comparative Example 1 is an example not including a dispersant.

Also, the addition amount of the dispersant is the weight ratio to the cellulose nanofibers, and the remaining amount is water (the same is true for Tables 2 to 4).

Examples 4 to 6, Comparative Examples 4 to 5

A cellulose nanofiber dispersion was prepared in the same manner as in Example 1, except that the type of the dispersant was changed to polybutylmethacrylate-methacryloyloxyethyl phosphorylcholine (LIPIDURE PMB, manufactured by NOF CORPORATION). The results are shown in Table 2.

Examples 7 to 9, Comparative Examples 6 to 7

A cellulose nanofiber dispersion was prepared in the same manner as in Example 1, except that the type of the dispersant was changed to polystearylmethacrylate-methacryloyloxyethyl phosphorylcholine (Lipidure NR, manufactured by NOF Corporation). The results are shown in Table 3.

Examples 10 to 12, Comparative Examples 8 to 10

A cellulose nanofiber dispersion was prepared in the same manner as in Example 1, except that the addition amount of the dispersant was made constant while the addition amount of the cellulose nanofibers was changed (Examples 10-12). On the other hand, a cellulose nanofiber dispersion was prepared and evaluated in the same manner as in Example 1 (Comparative Examples 8 to 10), except that the addition amount of the cellulose nanofibers was changed without adding a dispersant. The results are shown in Table 4.

TABLE 1

| | Addn. Amount of Cellulose (wt %) | Addn. Amount of Dispersant (wt %) | Zeta Potential (mv) | Dispersibility | | Sedimentation Stability |
|---|---|---|---|---|---|---|
| | | | | Dispersion | Aggregation | |
| Ex. 1 | 0.1 | 0.004 | −21.03 | Uniform Fine Dispersion | Not Observed | ○ |
| Ex. 2 | 0.1 | 0.008 | −36.01 | Uniform Fine Dispersion | Not Observed | ○ |
| Ex. 3 | 0.1 | 0.01 | −24.35 | Uniform Fine Dispersion | Not Observed | ○ |
| Comp. Ex. 1 | 0.1 | non | −12.82 | Inhomogeneous Dispersion | Up to ca. ½ of Liquid Volume Sedimentation | X |
| Comp. Ex. 2 | 0.1 | 0.002 | −14.53 | Inhomogeneous Dispersion | Up to ca. ¾ of Liquid Volume Sedimentation | X |
| Comp. Ex. 3 | 0.1 | 0.03 | −16.58 | Inhomogeneous Dispersion | Up to ca. ¾ of Liquid Volume Sedimentation | X |

TABLE 2

| | Addn. Amount of Cellulose (wt %) | Addn. Amount of Dispersant (wt %) | Zeta Potential (mv) | Dispersibility | | Sedimentation Stability |
|---|---|---|---|---|---|---|
| | | | | Dispersion | Aggregation | |
| Ex. 4 | 0.1 | 0.004 | −21.38 | Uniform Fine Dispersion | Not Observed | ○ |
| Ex. 5 | 0.1 | 0.008 | −32.72 | Uniform Fine Dispersion | Not Observed | ○ |
| Ex. 6 | 0.1 | 0.01 | −25.43 | Uniform Fine Dispersion | Not Observed | ○ |

TABLE 2-continued

| | Addn. Amount of Cellulose (wt %) | Addn. Amount of Dispersant (wt %) | Zeta Potential (mv) | Dispersibility Dispersion | Dispersibility Aggregation | Sedimentation Stability |
|---|---|---|---|---|---|---|
| Comp. Ex. 4 | 0.1 | 0.002 | −14.26 | Inhomogeneous Dispersion | Up to ca. ¾ of Liquid Volume Sedimentation | X |
| Comp. Ex. 5 | 0.1 | 0.03 | −18.93 | Inhomogeneous Dispersion | Up to ca. ¾ of Liquid Volume Sedimentation | X |

TABLE 3

| | Addn. Amount of CNF[*] (wt %) | Addn. Amount of Dispersant (wt %) | Zeta Potential (mv) | Dispersibility Dispersion | Dispersibility Aggregation | Sedimentation Stability |
|---|---|---|---|---|---|---|
| Ex. 7 | 0.1 | 0.004 | −30.39 | Uniform Fine Dispersion | Not Observed | ○ |
| Ex. 8 | 0.1 | 0.008 | −36.86 | Uniform Fine Dispersion | Not Observed | ○ |
| Ex. 9 | 0.1 | 0.01 | −28.53 | Uniform Fine Dispersion | Not Observed | ○ |
| Comp. Ex. 6 | 0.1 | 0.002 | −17.24 | Inhomogeneous Dispersion | Up to ca. ¾ of Liquid Volume Sedimentation | X |
| Comp. Ex. 7 | 0.1 | 0.03 | −16.64 | Inhomogeneous Dispersion | Up to ca. ½ of Liquid Volume Sedimentation | X |

[*] Cellulose Nanofibers

TABLE 4

| | Addn. Amount of CNF[*] (wt %) | Addn. Amount of Dispersant (wt %) | Zeta Potential (mv) | Dispersibility Dispersion | Dispersibility Aggregation | Sedimentation Stability |
|---|---|---|---|---|---|---|
| Ex. 10 | 0.5 | 0.008 | −35.98 | Uniform Fine Dispersion | Not Observed | ○ |
| Ex. 11 | 1 | 0.016 | −33.28 | Uniform Fine Dispersion | Not Observed | ○ |
| Ex. 12 | 2 | 0.032 | −29.04 | Uniform Fine Dispersion | Not Observed | ○ |
| Comp. Ex. 8 | 0.5 | non | −16.32 | Inhomogeneous Dispersion | Up to ca. ½ of Liquid Volume Sedimentation | X |
| Comp. Ex. 9 | 1 | non | −13.79 | Innomogeneous Dispersion | Up to ca. ½ of Liquid Volume Sedimentation | X |
| Comp. Ex. 10 | 2 | non | −11.14 | Innomogeneous Dispersion | Up to ca. ½ of Liquid Volume Sedimentation | X |

[*] Cellulose Nanofibers

Measurement of the zeta potential and dispersibility were performed as follows.
(Zeta Potential Measuring Method)

Sample preparation and measurement of the zeta potential were carried out in the following order.

After fully agitating the sample, dilute it with distilled water using a disposable glass test tube and adjust the concentration (wt % concentration) of the cellulose nanofibers to 0.01% by weight. Then, after ultrasonic treatment for 30 minutes, it was subjected to the following zeta potential measurement. The equipment used and measurement conditions are as follows.

Measuring Equipment: Zeta Potential/Particle Size Measuring System (manufactured by Otsuka Electronics Co., Ltd.)

Measuring Conditions: Standard Cell SOP tor the Zeta Potential

Measuring Temperature: 25.0° C.

Zeta Potential Conversion Formula: Smolchowski's Equation

Solvent Name: Water (Parameters of refractive index, viscosity, and dielectric constant of solvent are directly applied by ELSZ Software manufactured by Otsuka Electronics Co., Ltd.)

System Compatibility: Latex 262 nm standard solution (0.001%) does not exceed the specified value range.
(Visual Evaluation of Dispersion and Aggregation of Cellulose Nanofibers)

With respect to the zeta potential measurement solution described above, the dispersibility of the cellulose nanofibers and the presence or absence of sedimentation of the additive component were evaluated.

The uniform fine dispersion means that the whitish turbid dispersion entirely has a uniform brightness and a state, in which no color unevenness or aggregate is observed at all, is stable for a long time.

Inhomogeneous dispersion means that color unevenness is observed in the whitish turbid dispersion, the aggregates are scattered or the dispersion state changes with the lapse of time.

(Measurement Method of Sedimentation Stability)

After dispersibility of the obtained dispersion composition was visually evaluated, the dispersion liquid was allowed to stand still for 24 hours to observe visually whether or not the cellulose nanofibers was settled out (cellulose nanofiber settling stability).

◯: Even after the dispersion liquid is allowed to stand for 24 hours, the dispersion maintains a uniform white turbid state.

X: When the dispersion liquid is allowed to stand, the cellulose nanofibers settle out and the layers are separated into a transparent part (upper side) and an opaque part (lower side).

Effects of Embodiment

From Tables 1 to 4, so far as the dispersant comprises a (meth)acryloyloxyethyl phosphorylcholine (co)polymer, it has been found that the dispersibility of the cellulose nanofibers in water can be improved, thereby making it possible to produce a dispersion stable over time, even with the case of polymethacryloyloxyethyl phosphorylcholine, polybutylmethacrylate-methacryloyloxyethyl phosphorylcholine and polystearylmethacrylate-methacryloyloxyethyl phosphorylcholine.

Further, the ratio of the dispersant to the cellulose nanofibers is substantially constant, and when it is in a range from 4% by weight to 10% by weight, it is possible to obtain a dispersion which is uniformly finely dispersed, having a stable dispersion state.

Examples 13 to 18, Comparative Examples 11 to 12

Using the Apex Disperser Zero (K-2: Prototype No.), manufactured by Hiroshima Metal & Machinery Co. Ltd., as the Medialess disperser, a slurry-like material, in which dispersed purified water as a dispersing medium, the cellulose nanofibers and a sulfonic acid type dispersant (Aron A-6012, manufactured by Toagosei Co., Ltd.), was charged in the Medialess disperser and circulated at a circumferential rotation speed of 30 m/s to promote the dispersion of the cellulose by shearing to obtain the cellulose nanofibers with a stable dispersion.

That is, using the above apparatus, an aqueous dispersion containing 0.1% by weight of the cellulose nanofibers (BiNFi-s, manufactured by Sugino Machine Co., Ltd.) and the dispersants shown in Table 5 as a dispersant in the compounding ratio of Table 1 was allowed to repeat the Medialess dispersing treatment 5 times to prepare a cellulose nanofiber dispersion.

Thereafter, the dispersion above was transferred to a freeze drying container, frozen at −80° C., and then freeze dried using a freeze dryer (FD-1, manufactured by Tokyo Rika Kikai Co., Ltd.). After freeze drying, powdery cellulose nanofibers were obtained using a pulverizer. The obtained cellulose nanofiber dispersion and the properties of the powder material by the freeze pulverization are shown in Table 5. The bulk density of the powder material was measured in accordance with JIS K 7365.

Zeta potential, dispersibility, sedimentation stability and bulk density of the powder of the dispersion obtained in the above are shown in Table 5.

Incidentally, measurement items in the examples are as follows.

[Fiber Diameter]

Field emission type electron microscope (FE-SEM) photographs of 50,000 magnification were taken for the microfibers obtained in the examples and comparative examples, and on the photographed photographs, two lines were placed at arbitrary positions across the photograph drawing and counting of all fiber diameters intersecting with the lines were performed to calculate the average fiber diameter (n=20 or more). The way of drawing the lines is not particularly limited as long as the number of fibers crossing the lines is 20 or more. Further, from the measured value of the fiber diameter, the standard deviation of the fiber diameter distribution and the maximum fiber diameter were determined. In the case of microfibers having a maximum fiber diameter exceeding 1 μm, it was calculated using a 5,000 magnification SEM photograph.

[Bulk Density]

Measured twice using the cylinder and funnel described in JIS K7365, and the arithmetic average value was taken as the bulk density.

(Evaluation Method of Dispersibility and Sedimentation Stability)

The dispersibility of the obtained dispersion composition was visually evaluated, and then it was allowed to stand still for 24 hours to observe whether or not the precipitation of the cellulose nanofibers (CNF sedimentation stability) was visually observed.

Dispersibility:

◯: The color tone of the dispersion is uniform, there is no unevenness, and there is no aggregate.

X: The dispersion is not uniform and aggregates are present.

Sedimentation Stability:

◯: There is no layer separation in the dispersion after standing for 24 hours, and precipitation does not occur.

X: There occurs the layer separation after standing for 24 hours, and the cellulose nanofibers have settled out.

TABLE 5

| | Dispersant | | Zeta Potential of Dispersant [mV] | Dispersibility | Sedimentation Stability | Bulk Density of Powdery CNF*) [g/L] |
|---|---|---|---|---|---|---|
| | Kind | Compounding Ratio [wt %] | | | | |
| Ex. 13 | A-6114 | 10 | −36.69 | ◯ | ◯ | 117 |
| Ex. 14 | A-6012 | 10 | −39.67 | ◯ | ◯ | 119 |

TABLE 5-continued

|  | Dispersant | | | | | Bulk Density |
|---|---|---|---|---|---|---|
|  | Kind | Compounding Ratio [wt %] | Zeta Potential of Dispersant [mV] | Dispersibility | Sedimentation Stability | of Powdery CNF[*] [g/L] |
| Ex. 15 | Demol NL | 10 | −30.42 | ○ | ○ | 112 |
| Ex. 16 | SD-10 | 10 | −20.18 | ○ | ○ | 125 |
| Ex. 17 | A-6012 | 1 | −31.28 | ○ | ○ | 97 |
| Ex. 18 | A-6012 | 40 | −39.92 | ○ | ○ | 105 |
| Comp. Ex. 11 | A-6012 | 0.5 | −14.68 | X | X | 210 |
| Comp. Ex. 12 | A-6012 | 60 | −52.71 | X | X | 85 |

[*]Cellulose Nanofibers

Examples 19 to 21, Comparative Example 13

(In the Case where Cellulose Nanofiber Powder is Added to Thermoplastic Resin Matrix Component)

In Table 5, the powdery cellulose nanofibers according to Example 14 were blended so as to be 1, 5 and 10% by weight based on a polylactic acid resin (Ingeo Biopolymer 3001D, manufactured by Nature Works LCC) and after compounding the cellulose nanofibers and the resin by a twin screw extruder (BT-30, manufactured by Research Laboratory of Plastics Technology Co., Ltd., L/D=30), there were molded test pieces by injection molding, and the mechanical properties were evaluated in accordance with JIS K7161. Further, the fluidity of the composite material was measured at a barrel temperature of 200° C. and a measuring load of 700 N using a flow tester OFT-5000 (manufactured by Shimadzu Corporation) according to JIS K 7210. The results are shown in Table 6.

Incidentally, Comparative Example 13 is an example, in which no cellulose nanofibers are added.

TABLE 6

|  |  | Mechanical Properties | | | |
|---|---|---|---|---|---|
|  | Addn. Amount of CNF[*] (wt %) | Fluidity MFR (g/10 min) | Tensile Strength (MPa) | Tensile Modulus (GPa) | Tensile Elongation At Break (%) |
| Ex. 19 | 1 | 92 | 65 | 3.1 | 3.9 |
| Ex. 20 | 5 | 66 | 70 | 3.2 | 2.5 |
| Ex. 21 | 10 | 41 | 75 | 3.6 | 1.6 |
| Comp. Ex. 13 | 0.0 | 115 | 62 | 3.0 | 3.5 |

[*]Cellulose Nanofibers

From the comparison between Examples 19 to 21 and Comparative Example 13, when the cellulose nanofibers are added, the fluidity decreases according to the added amount, the tensile strength and tensile flexural modulus are improved, whereas the tensile elongation is decreasing.

Thus, according to the present invention, it is possible to obtain a composition where the cellulose nanofibers are uniformly and finely dispersed by a generic-purpose operation using a commercially available member.

Incidentally, in Example 13, except that the drying method of the cellulose nanofiber dispersion was changed from freeze drying to vacuum drying (<20 kPa×24 hours) or heat drying (130° C.×24 hours), a resin composition was prepared using the same operation as in Examples 19 to 21, test pieces were prepared by injection molding, and likewise the fluidity and mechanical properties of the resin composite (resin composition) were evaluated.

The same results as those in Table 5 were obtained also in the flowability and mechanical properties of the resin composition in any drying means, and the effect of adding the cellulose nanofibers and the effect of adding the dispersant were confirmed.

Examples 22 to 24, Comparative Examples 14 to 16

(In the Case where Cellulose Nanofiber Powder is Added to Thermosetting Resin Matrix Component)

The powder of the cellulose nanofibers of Example 14 obtained as described above (obtained by adding a dispersing agent and freeze dried after dispersing treatment) was blended so as to be 1, 5 and 10% by weight based on an epoxy resin (828, manufactured by Mitsubishi Chemical Corporation) and further a curing agent (Diamino diphenyl methane (DDM), manufactured by Wako Pure Chemical Industries, Ltd.) was added in an amount of 20% by weight based on the epoxy resin, and the cellulose nanofibers and the resin were compounded in an auto-mortar. The obtained resin mixture was heated to 80° C. to lower the viscosity, poured into a silicone mold having a cavity size of 50×100 mm, 3 mm sheets were prepared by heat molding (150° C.×4 hours), then machined to prepare test pieces of 50×100×3 mm, and the flexural strength and flexural modulus of the cured composite material thus obtained were evaluated according to JIS K7171. The results are shown in Table 7 (Examples 22 to 24).

On the other hand, an epoxy resin not containing the cellulose nanofibers was allowed to prepare a sheet of 50×100×3 mm in the same manner as in Example 22 by using the silicone mold, test pieces of 50×100×3 mm were prepared, and the flexural properties were evaluated (Comparative Example 14).

Also, except that the dispersant was not blended, the addition amount of the cellulose nanofibers prepared in accordance with Example 22 was allowed to be 5.0% by weight, whereby test pieces were prepared and evaluated in the same manner as in Example 22 (Comparative Example 15).

Further, test pieces were prepared and evaluated in the same manner as in Example 22, except that the addition amount of the cellulose nanofibers of Example 22, in which the added dispersant was to be 15% by weight (Comparative Example 16).

The above results are shown in Table 8.

TABLE 7

|  | Addn. Amount of CNF*) (wt %) | Mechanical Properties | |
|---|---|---|---|
|  |  | Flexural Strength (MPa) | Flexural modulus (GPa) |
| Ex. 22 | 1 | 145.6 | 2.8 |
| Ex. 23 | 5 | 155.8 | 3.1 |
| Ex. 24 | 10 | 158.9 | 3.4 |
| Comp. Ex. 14 | 0 | 134.2 | 2.7 |
| Comp. Ex. 15 | 5.0 No Dispersant | 113.4 | 3.0 |

*)Cellulose Nanofibers

TABLE 8

|  | Addn. Amount of CNF*) (wt %) | Mechanical Properties | |
|---|---|---|---|
|  |  | Flexural Strength (MPa) | Flexural Modulus (GPa) |
| Comp. Ex. 16 | 15 Dispersant Added | 60.6 | 3.0 |

*)Cellulose Nanofibers

From the comparison between Examples 22 to 24 and Comparative Examples 14 to 15 in Table 7, the following can be seen.

That is, the composition of Example 22, to which 1% of the cellulose nanofibers was added, improved the flexural strength and flexural modulus as compared with the composition of Comparative Example 14, to which the cellulose nanofibers were not added. The composition of Example 23, to which the dispersant was added, showed a remarkable improvement particularly in the flexural strength as compared with Comparative Example 15. This is probably because the dispersibility of the cellulose nanofibers used in Example 23 is improved by the dispersant in the matrix component. In Example 24, in which the addition amount of the cellulose nanofibers was increased as compared with Example 23, both of the flexural strength and flexural modulus were improved.

On the other hand, from Comparative Example 16 in Table 8, when the nanofibers addition amount reaches 15% by weight, the flexural strength returns and decreases, and the value of the flexural modulus also reaches a ceiling. This is because when the addition amount of the cellulose nanofibers is large, the dispersion of the cellulose nanofibers to the resin composition is not sufficient, the surface of the cellulose nanofibers is not sufficiently wetted with the matrix resin to form aggregates of the cellulose nanofibers, thereby considerably resulting in a defect point in the molded products. From this, it is considered that the preferable addition amount of the cellulose nanofibers is 10% by weight or less in the composition of the present invention, even in the case of using the thermosetting resin as the matrix.

Examples 25 to 27, Comparative Examples 17 to 19

(In the Case where Cellulose Nanofibers Powder is Added to Rubber Matrix Component)

The powder obtained in the above Example 14 was blended so as to be 1, 5 and 10% by weight based on natural rubber (NR), and the cellulose nanofibers and the rubber were compounded with twin open rolls, whereby a thick sheet with a thickness of 1 mm was obtained. Thereafter, micro dumbbell shaped tensile test pieces having a parallel part size of 5×12 mm was manufactured by punching to evaluate the mechanical properties, and the mechanical properties of a rubber composite material were evaluated based on JIS K 6251. The results are shown in Table 9 (Examples 25 to 27).

Meanwhile, the natural rubber (NR) not containing the cellulose nanofibers was similarly machined into test pieces and the mechanical properties were evaluated (Comparative Example 17).

Also, except that the dispersant was not compounded therein, using 5% by weight of the cellulose nanofibers, test pieces were prepared in accordance with Example 13, and there were carried out evaluations thereof in the same manner as Example 25 (Comparative Example 18).

The results above are shown in Table 9.

TABLE 9

|  | Addn. Amount of Cellulose Nanofibers (wt %) | Tensile Strength (MPa) |
|---|---|---|
| Ex. 25 | 1.0 | 6.1 |
| Ex. 26 | 5.0 | 18.2 |
| Ex. 27 | 10.0 | 30.2 |
| Comp. Ex. 17. | 0 | 5.1 |
| Comp. Ex. 18 | 5.0 No Dispersant | 6.4 |

From Table 9, the following can be seen. That is, the composition of Example 25, to which 1% by weight of cellulose nanofibers was added, improved the higher tensile strength, as compared with the composition of Comparative Example 17, to which the cellulose nanofibers were not added.

In addition, with respect to the composition of the cellulose nanofibers of Comparative Example 18, to which the dispersant had not been added, the composition of Example 26, to which the dispersant was added, was greatly improved in the tensile strength. This is considerably because the dispersibility of the cellulose nanofibers used in Example 26 is improved by the dispersant in the matrix component. Furthermore, in Example 27, in which the addition amount of the cellulose nanofibers was increased, as compared with Example 26, the tensile strength was greatly improved.

Incidentally, in Example 14, except that the dispersant (Aron A-6012, manufactured by Toagosei Co., Ltd.) was changed to methacroyloxyethyl phosphorylcholine (co)polymer (Lipidure BL, manufactured by NOF CORPORATION) or acrylic carboxylic acid copolymer (Aron A-614, manufactured by Toagosei Co., Ltd.), a resin composition was prepared in the same manner as in Examples 19 to 21 or Examples 25 to 27, and thereafter the same evaluation was carried out.

Since the same results as in Example 14 were obtained with respect to the zeta potential and sedimentation stability of the cellulose nanofiber dispersion as well as the bulk density, flexural strength, flexural modulus of elasticity and tensile strength of the powdery cellulose nanofibers, the crosslinking and addition effects of the cellulose nanofibers could be confirmed even in any of the dispersants. In this case, the addition amount, sample preparation condition and evaluation condition were all the same as in Example 14.

Examples 28 to 30 (In the Case where Matrix Component is Thermoplastic Resin)

Using the Apex Disperser Zero (K-2: Prototype No.), manufactured by Hiroshima Metal & Machinery Co., Ltd. as the Medialess disperser, a slurry-like material, in which purified water as a dispersion medium, commercially available cellulose nanofibers and a dispersant were dispersed, was charged in the Medialess disperser and circulated at a peripheral speed of 30 m/s to promote the dispersion of the cellulose by shearing to obtain the cellulose nanofibers with a stable dispersion.

That is, with respect to an aqueous dispersion containing 0.1% by weight of the cellulose nanofibers (BiNFi-s, manufactured by Sugino Machine Co., Ltd.) and 0.04% by weight of polymethacryloyloxyethyl phosphorylcholine (LIPIDURE HM, manufactured by NOF CORPORATION) as the dispersant, there were repeated the Medialess disperser treatment 5 times to prepare a cellulose nanofiber dispersion, then transferred to a container for freeze drying, frozen at −80° C., and thereafter freeze dried using a freeze dryer (FD-1, manufactured by Tokyo Rika Kikai Co., Ltd.). After the freeze drying, it was pulverized using a pulverizer.

After the powder obtained above was compounded with a polylactic acid resin (Ingeo Biopolymer 3001 D, manufactured by Nature Works LCC) so as to be 1, 5 and 10% by weight based thereon and allowed to compound with the cellulose nanofibers and the resin by a twin screw extruder (BT-30, manufactured by Research Laboratory of Plastics Technology Co., Ltd.: L/D=30), test pieces were molded by injection molding and the mechanical properties were evaluated.

Incidentally, the fluidity of the composite material was measured under the conditions of a barrel temperature of 200° C. and a measuring load of 700 N using a flow tester (CFT-5000, manufactured by Shimadzu Corporation) based on JIS K 7210.

In addition, the mechanical properties were measured by a tensile test at a test speed of 1 mm/min using a precision universal testing machine (Autograph AG-X plus, manufactured by Shimadzu Corporation) based on JIS K7161 to measure tensile strength, tensile flexural modulus and tensile elongation at break were determined.

The results are shown in Table 10.

Comparative Examples 19 to 20

A polylactic acid resin not containing the cellulose nanofibers and a polylactic acid resin containing 5% by weight of the cellulose nanofibers without a dispersant were molded by injection molding in the same manner as described above to form test pieces and operated in the same manner as above, and the fluidity and mechanical properties were evaluated.

The results are shown in Table 10.

Comparative Example 21

In Example 28, test pieces were prepared by injection molding in the same manner, except that the amount of the cellulose nanofibers was 15% by weight and the amount of the dispersant was increased accordingly, and the mechanical properties were similarly measured. The results are shown in Table 11.

TABLE 10

| | Addn. Amount of CNF*) (wt %) | Fluidity MFR (g/10 min) | Mechanical Properties | | |
|---|---|---|---|---|---|
| | | | Tensile Strength (MPa) | Tensile Modulus (GPa) | Tensile Elongation At Break (%) |
| Ex. 28 | 1.0 | 90 | 66 | 3.2 | 3.0 |
| Ex. 29 | 5.0 | 65 | 72 | 3.5 | 2.4 |
| Ex. 30 | 10.0 | 40 | 77 | 3.8 | 1.5 |
| Comp. Ex. 19 | 0 | 115 | 62 | 3.0 | 3.5 |
| Comp. Ex. 20 | 5.0 No Dispersant | 100 | 55 | 3.3 | 1.8 |

*)Cellulose Nanofibers

TABLE 11

| | Addn. Amount of CNF*) (wt %) | Fluidity MFR (g/10 min) | Mechanical Properties | | |
|---|---|---|---|---|---|
| | | | Tensile Strength (MPa) | Tensile Modulus (MPa) | Tensile Elongation At Break (%) |
| Comp. Ex. 21 | 15 Dispersant Added | 300 | 40 | 4.1 | 1.2 |

*)Cellulose Nanofibers

From Examples 28 to 30 and Comparative Examples 19 to 20, when the cellulose nanofibers were added, the fluidity was lowered according to the added amount, the tensile strength and the tensile flexural modulus were improved, but the tensile elongation decreased In addition, from Comparative Example 21 in Table 11, when the amount of the nanofibers added is 15% by weight, the fluidity is greatly improved, however the degradation of the mechanical properties is observed. This is considered to be because of excessive shearing force acted on the screws in the extruder, when the amount of the cellulose nanofibers was large, as the result, there would be caused the hydrolysis of the polylactic acid resin. From this, it is considered that the preferable addition amount of the cellulose nanofibers to the composition of the present invention is 10% by weight or less.

Also, the cellulose nanofibers added without a dispersing agent (Comparative Example 20) had a lower tensile strength than those added the polylactic acid resin alone (Comparative Example 19). This is probably because the cellulose nanofibers were not uniformly dispersed and large aggregates thereof were remained inside the molded articles. Thus, according to the present invention, it is possible to obtain a resin composition where the cellulose nanofibers are finely dispersed uniformly by a relatively simple operation using commercially available members.

Here, in the same manner as in Example 28, except that the drying method of the cellulose nanofiber dispersion was changed from freeze drying to reduced pressure drying (<20 kPa×24 hours) or heat drying (130° C.×24 hours), the resin dispersion was prepared, test pieces were prepared in the same manner as above by injection molding, and likewise the fluidity and mechanical properties of the resin composite were evaluated.

In both cases, the same results as in Table 1 were obtained in the fluidity and mechanical properties of the resin mixture, and the effect of adding the cellulose nanofibers and the effect of adding the dispersant were confirmed.

Incidentally, in this case, the addition amount, sample preparation condition, and evaluation condition were all the same as in Example 28.

Examples 31 to 33

(In the Case where Matrix Component is Thermosetting Resin)

After the powdery cellulose nanofibers (to which a dispersant was added) obtained as above were mixed with an epoxy resin (828, manufactured by Mitsubishi Chemical Corporation) so as to be 1, 5 and 10% by weight, respectively, further, 20% by weight of a curing agent (diaminodiphenylmethane (DDM), manufactured by Wako Pure Chemical Industries Ltd.) for the epoxy resin, the cellulose nanofibers and the resin were combined with an auto-mortar.

The obtained resin mixture was heated to 80° C. to lower its viscosity and then injected into a silicone mold having a cavity size of 50×100 mm, and a sheet having a thickness of 3 mm was formed by heat molding (150° C.×4 hours), and the mechanical properties of the composite material were evaluated. The results are shown in Table 12.

Compression molding was carried out under the conditions of setting the above silicone mold in a vacuum heating furnace, at 200 kPa or less and 150° C. for 20 minutes.

Micro dumbbell shaped tensile test pieces having a parallel portion of 5×10 mm were obtained from the obtained sheet by machining.

In addition, the mechanical properties were measured according to JIS K7171 by performing bending tests at Autograph AG-X plus (20 kN) manufactured by Shimadzu Corporation at a test speed of 1 mm/min to measure the flexural strength and flexural modulus.

Comparative Examples 22 to 23

In Comparative Example 22, a curing agent was added to an epoxy resin not containing the cellulose nanofibers, the sheet-like molded articles having a thickness of 3 mm were molded in the same manner as in Example 31, and micro dumbbell shaped tensile test pieces were produced by machining to measure the flexural strength and flexural modulus. In Comparative Example 23, the cellulose nanofibers without the dispersant of Comparative Example 20 was used to prepare test pieces using the epoxy resin and evaluated in the same manner as in Example 31. Further, in Comparative Example 23, test pieces were prepared using the epoxy resin in the same manner as in Example 31, except that the addition amount of the cellulose nanofibers with the dispersant was 15% by weight, corresponding to Comparative Example 21, and evaluated in the same manner as above. In addition, it is shown in Table 12.

Comparative Example 24

Test pieces were prepared by injection molding in the same manner as in Example 28, except that the amount of the cellulose nanofibers was 15% by weight and the amount of the dispersant was increased accordingly, in the same manner as in Example 28, the mechanical properties were similarly measured. The results are shown in Table 13.

TABLE 12

| | Addn. | Mechanical Properties | |
|---|---|---|---|
| | Amount of CNF*) (wt %) | Flexural Strength (MPa) | Flexural modulus (GPa) |
| Ex. 31 | 1.0 | 145.6 | 2.8 |
| Ex. 32 | 5.0 | 155.8 | 3.1 |
| Ex. 33 | 10.0 | 158.9 | 3.4 |
| Comp. Ex. 22 | 0 | 134.2 | 2.7 |
| Comp. Ex. 23 | 5.0 No Dispersant | 113.4 | 3.0 |

*)Cellulose Nanofibers

TABLE 13

| | Addn. | Mechanical Properties | |
|---|---|---|---|
| | Amount of CNF*) (wt %) | Flexural Strength (MPa) | Flexural Modulus (GPa) |
| Comp. Ex. 24 | 15 Dispersant Added | 60.6 | 3.0 |

*)Cellulose Nanofibers

From Examples 31 to 33 and Comparative Examples 22 to 23 of Table 12, when the cellulose nanofibers are added, the flexural strength and flexural modulus are improved according to the added amount.

Further, from Comparative Example 24 in Table 13, when the nanofibers addition amount reaches 15% by weight, the flexural strength returns and decreases, and the value of the flexural modulus also reaches a ceiling. This is considered as to be because when the addition amount of the cellulose nanofibers is large, the dispersion of the cellulose nanofibers to the resin composition is not sufficient, the surface of the cellulose nanofibers is not sufficiently wetted with the matrix resin, and an aggregate of the cellulose nanofibers is formed, thereby conceivably causing a defect point in the molded product. From this, it is considered that the preferable addition amount of the cellulose nanofibers is 10% by weight or less, even in the case of using the thermosetting resin as the matrix in the composition of the present invention.

Examples 34 to 36, Comparative Examples 25 to 26

Using the Apex Disperser Zero (K-2: Prototype No.), manufactured by Hiroshima Metal & Machinery Co., Ltd. as the Medialess disperser, a slurry-like material, in which purified water as a dispersion medium, commercially available cellulose nanofibers and a dispersant were dispersed, was charged in the Medialess disperser and circulated at a peripheral speed of 30 m/s to promote the dispersion of the cellulose by shearing to obtain cellulose nanofibers with a stable dispersion.

That is, with respect to an aqueous dispersion containing 0.1% by weight of the cellulose nanofibers (BiNFi-s, manufactured by Sugino Machine Co., Ltd.) and 0.04% by weight of methacryloyloxyethyl phosphorylcholine (co)polymer as a dispersant, the Medialess dispersing treatment was repeated 5 times to prepare a dispersion of the cellulose nanofibers, then transferred to a container for freeze drying, frozen at −80° C., and thereafter freeze dried in a freeze drier (FD-1, manufactured by Tokyo Rika Kikai Co., Ltd.) and freeze dried. After freeze drying, the dried matter was pulverized using a pulverizer.

The powder obtained above was blended with polylactic acid resin (Ingeo Biopolymer 3001 D, manufactured by Nature Works LCC) so as to be 1, 5 and 10% by weight based thereon, and the cellulose nanofibers and the resin were compounded by a twin screw extruder (BT-30, manufactured by Research Laboratory of Plastics Technology Co., Ltd., L/D=30), and a strand of φ1.75 mm was taken out using a strand die to obtain a monofilament for a 3D printer. Further, this filament was pelletized with a length of 2 mm by a strand cutter, and test pieces for evaluating mechanical properties were injection molded.

Using these injection molded test pieces, mechanical properties (tensile strength, tensile elongation at break, tensile modulus) were measured by Autograph (AG-X PLUS). Further, the lengthwise dimension of the test piece molded articles was measured with a micrometer, and the shrinkage factor was calculated based on the mold cavity dimension. Further, the fluidity of the composite material was measured with a flow tester (CFT-5000, manufactured by Shimadzu Corporation) at a barrel temperature of 200° C. and a measuring load of 700 N.

In addition, as the effect of shape stability by the CNF (cellulose nanofibers), with respect to the screw thread of the thread portion of the M16 hexagon bolt (FIG. 1), which was actually manufactured by the use of a hot melt lamination type 3D printer (Creatr Dual, manufactured by Leapflog), the magnitude of the deviation from the reference line of the top part of the thread of the thread part was measured with a profile projector (V-12, manufactured by Nikon Corporation).

The results are shown in Table 14.

From the comparison between Examples 32 to 34 and Comparative Examples 25 to 26, when the cellulose nanofibers are added, the fluidity is lowered according to the added amount and the tensile strength and tensile flexural modulus are improved, whereas the shrinkage factor of the injection molded product is reduced as the tensile elongation decreases. Furthermore, the misalignment of threads decreases as the amount of the cellulose nanofibers increases. This is considered to be a synergistic effect of a decrease in the shrinkage rate of the injection molded article and a decrease in the fluidity of the material.

In this way, by adding the cellulose nanofibers to a 3D material for the 3D printer, the strength and flexural modulus are increased, and the shape accuracy as a molded product is improved. Furthermore, using the molding material for the 3D printer obtained in the above example, appearance observation was performed on a three-dimensional model to which a 3D printer (Creatr Dual, manufactured by Leapflog Co.) was applied. As a result, the designed shape could be more precisely reproduced as a shaped object, and it was a shaped object excellent in surface smoothness, transparency and dyeability.

TABLE 14

|  | Addn. Amount of CNF*) (wt %) | Fluidity MFR (g/10 min) | Mechanical Properties | | | Shrinkage | |
|  |  |  | Tensile Strength (MPa) | Tensile Modulus (MPa) | Tensile Elongation At Break (%) | Ratio of Injection Mold (%) | Magnitude of Deviatn. from Ref. Line (mm) |
| --- | --- | --- | --- | --- | --- | --- | --- |
| Ex. 34 | 1.0 | 90 | 66 | 4 | 3.0 | 4 | 0.015 |
| Ex. 35 | 5.0 | 65 | 72 | 2 | 2.4 | 2 | 0.01 |
| Ex. 36 | 10.0 | 40 | 77 | 2 | 1.5 | 2 | 0.005 |
| Comp. Ex. 25 | 0 No Dispersant | 115 | 62 | 5 | 3.5 | 5 | 0.02 |
| Comp. Ex. 26 | 5 Dispersant Added | 100 | 55 | 3 | 1.8 | 3 | 0.02 |

*)Cellulose Nanofibers

INDUSTRIAL APPLICABILITY

In various fields such as mechanical parts, structural members, filter members, high gas barrier packaging members, electronics devices, optical members, foods, medicines, cosmetics, healthcare, and the like, it can be expected for the cellulose nanofiber dispersion of the present invention to improve the functions of structural materials, sliding materials, paint materials, molding materials, film materials, and the like, by combining with various polymeric materials, and the like.

In addition, since the powdery cellulose nanofibers of the present invention are excellent in uniform dispersibility in resins, conformability with resins and interfacial adhesion, it can be uniformly blended easily with thermoplastic resins, thermosetting resins, or rubber components to obtain a highly functional resin composition.

For example, by forming pellets for molding with a twin screw extruder or the like, parts of various uses can be obtained by a general resin molding method such as injection molding. Examples thereof include industrial machine parts such as electrical equipment housings and general mechanical parts, parts for automobiles, railroads, ships, air-related parts, parts for electronic/electric devices (including housings), daily necessities, sports leisure goods (camping supplies, fitness goods, various protectors, and the like), tires, various damping rubbers, protective pads, and the like. In addition, it can be suitably used as a film or a coating material for packaging applications, and the like.

Also, when the resin composition of the present invention is used as a filament for a 3D printer, it is preferable not only to perform trial manufacture of various mechanical parts efficiently with high precision but also to produce a shaped article having high functionality

The invention claimed is:

1. A nanofiber dispersion comprising nanofibers and a dispersant, wherein the dispersant is (meth)acryloyloxyethyl phosphorylcholine (co)polymer.

2. The nanofiber dispersion according to claim 1, wherein the nanofibers are cellulose nanofibers.

3. The nanofiber dispersion according to claim 2, wherein an average diameter of the cellulose nanofibers is 10-100 nm.

4. The nanofiber dispersion according to claim 1, wherein (meth)acryloyloxyethyl phosphorylcholine (co)polymer constituting the dispersant is at least one kind selected from a group consisting of polymethacryloyloxyethyl phosphorylcholine, polybutylmethacrylate methacryloyloxyethyl phosphorylcholine and polystearylmethacrylatemethacryloyloxyethyl phosphorylcholine.

5. The nanofiber dispersion according to claim 1, wherein the dispersion contains
   (i) the nanofibers at a proportion of 0.01-10% by weight based on the dispersion and
   (ii) the dispersant at a proportion of 0.1-50% by weight based on the aforesaid nanofibers, corresponding to 0.00001-5% by weight based on the dispersion.

6. A method of producing the nanofiber dispersion according to claim 1 comprising treating the dispersant containing a raw material of the nanofibers and a dispersant with a Medialess disperser.

\* \* \* \* \*